(12) United States Patent
Scapini et al.

(10) Patent No.: US 11,619,213 B1
(45) Date of Patent: Apr. 4, 2023

(54) RENEWABLE POWER GENERATION SYSTEM AND METHOD

(71) Applicant: NOOTER/ERIKSEN, INC., Fenton, MO (US)

(72) Inventors: Piero Scapini, Milan (IT); Shaun P. Hennessey, St. Charles, MO (US)

(73) Assignee: NOOTER/ERIKSEN, INC., Fenton, MO (US)

( * ) Notice: Subject to any disclaimer, the term of this patent is extended or adjusted under 35 U.S.C. 154(b) by 0 days.

(21) Appl. No.: 17/909,554

(22) PCT Filed: Mar. 8, 2021

(86) PCT No.: PCT/US2021/021332
§ 371 (c)(1),
(2) Date: Sep. 6, 2022

(87) PCT Pub. No.: WO2021/183424
PCT Pub. Date: Sep. 16, 2021

Related U.S. Application Data

(60) Provisional application No. 62/987,135, filed on Mar. 9, 2020.

(51) Int. Cl.
| | |
|---|---|
| *F03G 6/06* | (2006.01) |
| *F01D 15/10* | (2006.01) |
| *F24S 20/20* | (2018.01) |
| *F01K 3/18* | (2006.01) |

(52) U.S. Cl.
CPC .............. *F03G 6/066* (2021.08); *F01D 15/10* (2013.01); *F01K 3/18* (2013.01); *F03G 6/063* (2021.08); *F24S 20/20* (2018.05); *F05D 2220/31* (2013.01); *F05D 2220/76* (2013.01)

(58) Field of Classification Search
CPC .......... F03G 6/066; F03G 6/063; F01D 15/10; F01K 3/18; F24S 20/20; F05D 2220/31; F05D 2220/76
USPC ..................... 60/641.1–641.15, 676
See application file for complete search history.

(56) References Cited

U.S. PATENT DOCUMENTS

| | | | |
|---|---|---|---|
| 3,950,949 A * | 4/1976 | Martin | F03G 7/04 60/676 |
| 8,341,960 B2 * | 1/2013 | Berger | F01K 25/10 60/671 |
| 2011/0048011 A1 | 3/2011 | Okita et al. | |
| 2011/0127773 A1 | 6/2011 | Freund et al. | |
| 2011/0209474 A1 | 9/2011 | Leibowitz | |
| 2013/0133324 A1 * | 5/2013 | Reynolds | F03G 6/067 60/641.15 |

(Continued)

OTHER PUBLICATIONS

International Search Report for PCT/US2021/021332 dated May 25, 2021.

(Continued)

*Primary Examiner* — Hoang M Nguyen
(74) *Attorney, Agent, or Firm* — Sandberg Phoenix & von Gontard, PC

(57) ABSTRACT

A system is disclosed that utilizes renewable energy to generate high temperature, superheated steam for driving a prime mover, such as a steam turbine coupled to an electrical generator, and/or to deliver heat where only a portion of the renewable energy system needs to withstand a high temperature working fluid that is necessary to generate high temperature superheated steam.

53 Claims, 12 Drawing Sheets

(56) References Cited

U.S. PATENT DOCUMENTS

| | | | |
|---|---|---|---|
| 2015/0082792 A1* | 3/2015 | Bain | F24S 60/00 60/645 |
| 2017/0002799 A1 | 1/2017 | Mishima et al. | |
| 2018/0245485 A1* | 8/2018 | Conlon | F22B 1/006 |

OTHER PUBLICATIONS

Written Opinion for PCT/US2021/021332 dated May 25, 2021.
International Preliminary Report on Patentability dated Apr. 25, 2022.

* cited by examiner

RENEWABLE POWER GENERATION SYSTEM AND METHOD

CROSS-REFERENCE TO RELATED APPLICATIONS

This application is the U.S. National Stage under USC § 371 of International Application No. PCT/US2021/021332 filed Mar. 8, 2021 which claims priority to U.S. Provisional Patent Application No. 62/987,135 filed Mar. 9, 2020, the content of said applications in which is incorporated herein in its entirety.

STATEMENT REGARDING FEDERALLY SPONSORED RESEARCH

Not Applicable.

BACKGROUND OF THE DISCLOSURE

This disclosure relates to a system that utilizes renewable energy to generate high temperature superheated steam for driving a prime mover, such as a steam turbine, and/or to deliver heat, namely high temperature heat, where only a portion of the renewable energy system need be designed, engineered and fabricated to withstand a high temperature working fluid that is necessary to generate high temperature superheated steam.

SUMMARY OF THE DISCLOSURE

A renewable energy system is described for producing superheated steam to power a steam turbine, for heating $CO_2$, or for heating other working fluids for driving an electrical generator, and/or providing high temperature heat. These types of systems have faced certain problems, namely, how to supply high temperature superheated steam to a steam turbine (or to heat such other working fluid mediums to a high temperature) so that the turbine will operate most efficiently without requiring that the entire renewable system operate at high temperatures. As noted above, this disclosure relates to heating any working fluid or medium to a high temperature, but in this disclosure the focus is primarily on generating superheated steam for driving a steam turbine that drives an electrical generator using renewable energy where only a portion of the system need be engineered and designed to withstand the high temperature necessary to generate the superheated steam. However, those skilled in the art should understand that this disclosure applies to heating any heat transfer fluid or heat storage medium to a high temperature.

The superheating of steam would normally require the entire renewable energy system to operate at such high temperatures, which in turn would require the renewable system to be designed to withstand such high temperatures so that, for example, the energy supplied by the renewable system could superheat large quantities of steam. In turn, this required that the renewable energy system, its components (e.g., pumps, valves, piping, and the like) to be made of high temperature materiel (such as Inconel® alloys or other high temperature alloys or materials) that are quite expensive. In the case of a concentrated solar power (CSP) system with mirror reflectors (e.g., heliostats) that heat a working fluid in a tower, it requires that the heliostat field to be quite large and it requires that a working fluid must be heated in the tower and piped to the system at high temperatures so as to supply superheated steam to the turbine at, for example, 630° C. (1166° F.) or higher. In order to generate superheated steam at such high temperatures, the working fluid must be heated to a temperature substantially above the temperature of the superheated steam to be generated and that a sufficient quantity of such hot working fluid must be made available for extended periods, such as at night or on cloudy days if the renewable system is a solar powered electrical generating system, or if the wind does not blow if the renewable system uses wind power to generate electricity. For example, it may be desirable that the working fluid used to superheat the steam be heated and stored at a very high temperature range well above the desired temperature of the superheated steam. However, it will be recognized that if a CSP system is to be used to heat a suitable working fluid to such high temperatures, this poses substantial engineering design issues and costs on the system because the entire system must be designed and fabricated to withstand the high temperatures necessary to generate high temperature superheated steam, which imposes substantial engineering and cost issues.

It was recognized that it would be advantageous to have a system that uses renewable energy to power a steam turbine where low/moderate heat produced by a CSP system is used to generate low/moderate temperature steam and then another compartmentalized renewable energy system is used to heat the low/moderate temperature steam to a desired superheated condition. For example, this second renewable energy system may be a photovoltaic (PV) system (or other renewable energy system that generates electricity) where all or a part of the electricity generated by the PV system is used to locally heat a working fluid to its desired high temperature where the hot working fluid is used to superheat the low/moderate temperature steam to deliver superheated steam to the steam turbine. In accordance with the present disclosure, this high temperature working fluid may be a heat transfer gas that is heated by a high temperature storage medium that is electrically heated by electric heaters powered by electricity generated by the second renewable energy system. In this manner only a portion of the overall system need be designed to operate at the above-mentioned high temperature. This minimizes the need for high temperature materials to deal with the high temperatures and minimizes high temperature thermal losses.

The current disclosure is, in its simplest terms, a compartmentalized renewable power generation system that utilizes heat from a first compartment or block, which may be a low/moderate temperature renewable energy system, such as a concentrated solar power (CSP) system, which generates low/moderate temperature steam. In accord with the present disclosure, a second compartment or block is another renewable energy system that produces electrical energy. This second compartment or block may be any renewable electrical generating system, such as a photovoltaic (PV) system, a wind turbine system, a hydroelectric system, or a storage battery bank system. The electrical energy generated by this second renewable energy system (or a portion of such electrical energy) is used to boost or enhance the temperature (i.e., to heat) of a high temperature working fluid which is used to superheat the steam generated by the low/moderate temperature system such that only a small portion of the overall system need be heated to a high temperature. More particularly, the heat from the secondary renewable system is used to heat a heat storage medium, which in turn is used to heat the second working fluid to a sufficiently high temperature to generate sufficient quantities of superheated steam necessary to efficiently operate a steam turbine. The quantity of the heat storage medium is such that it will continue to heat the high temperature working fluid so as to generate superheated steam when energy from the second renewable source is not available, such as at night or when the wind does not blow. In this compartmentalized system of the present disclosure, both renewable energy systems provide heat to a shared or main power cycle system, referred as a third compartment or block, that includes a steam turbine such that both renewable energy systems power the steam turbine. In this manner, a first renewable energy system supplies low/moderate heat to make low/moderate temperature steam and the second renewable energy system (e.g., a PV system) supplies a working fluid at a sufficiently high temperature to superheat the low/moderate temperature steam and to supply the superheated steam required by the steam turbine to operate efficiently.

Further in accordance with the present disclosure, only a portion of the second renewable energy system need be engineered to withstand the high temperatures that are required to supply the high temperature working fluid necessary to superheat the low/moderate temperature steam that is supplied to the steam turbine. Thus, this compartmentalized system has a much lower cost of equipment and construction than other systems. Both the first and second renewable energy systems must have sufficient heat storage capability to supply the steam turbine of the power generation system over extended periods (e.g., over an 8-12 hour period or more) when the renewable energy systems are not available, such as at night, on cloudy days, or when the wind is not blowing.

More specifically, the preferred embodiment of the present disclosure describes a compartmentalized renewable power generation system that powers a third block, namely a power system, such as a steam turbine driving an electrical generator. In this preferred embodiment, heat collected from or by a first renewable energy system, such as from a low/moderate temperature concentrated solar power (CSP) system, heats a first or low/moderate temperature working fluid, such as molten salt, and where the heat from the CSP system incorporates energy storage via the molten salt working fluid. The quantity of the first or low/moderate temperature working fluid that is stored is sufficient to generate low/moderate temperature steam during extended periods when the first renewable energy system is not effectively operable, such as during bad weather when the sun is not shining or at night. The heat from this low/moderate temperature renewable system is boosted or enhanced by a second or high temperature renewable energy system that the latter heats a second or high temperature working fluid (e.g., a heat transfer gas) such that only a portion of the second renewable energy system need be engineered and constructed to withstand such high temperatures as may be needed to supply superheated steam to the steam turbine. The second or high temperature renewable energy system is, preferably, a system that generates electricity, such as a photovoltaic (PV) electrical power system, a wind generated electrical power system, hydroelectric power system, a battery backup electrical power storage system, or the like. Electricity from the second renewable energy system heats via electrical resistance heaters or the like a heat storage medium to a very high temperature. The heat storage medium is preferably, but not necessarily, a latent heat of fusion storage system that utilizes a phase change of a heat storage medium, preferably a molten metal or a metalloid, to store high temperature heat. However, within the broader aspects of this disclosure a heat storage medium that does not change phase, such as a mass of concrete, sand, rocks, or ceramic material, may be used. A heat transfer gas is circulated to be in heat exchange relation with the heat storage medium to be heated to a sufficiently high temperature to superheat the low/moderate temperature steam. The heat capacity of the heated heat storage medium is sufficient for operation of the system to generate such superheated steam when the second renewable energy system is not available, such as when the weather is bad and/or the sun is not shining, at night, or when the wind is not blowing. Thus, both renewable energy systems provide heat to supply superheated steam to the steam turbine. Importantly, in accord with the present disclosure, only the portion of the second renewable energy system that heats and stores the heat storage medium and the portion of the second system that delivers the hot heat transfer gas to a superheater need be engineered and constructed to withstand the high temperatures of the high temperature of heat storage medium and the heat transfer gas.

As mentioned, this disclosure in its preferred embodiment is a compartmentalized or segmented renewable power and/or heat generation system and method that utilizes heat from a first or low/moderate temperature renewable energy system, such as a concentrated solar power (CSP) system. Energy from this first renewable energy system is stored by a first working fluid, such as molten salt, in an appropriate storage tank or the like. This relatively low/moderate temperature heat is used to produce low/moderate temperature steam. High temperature heat from a second renewable energy system, such as a photovoltaic (PV) electricity generation system, is used to boost the low/moderate temperature steam to superheated steam that is supplied to a steam turbine/generator set in a common power cycle. Thus, only a portion of the second renewable energy system must be engineered to have high temperature materials and components, which markedly reduces the cost of the overall system. In a preferred embodiment of the system of this disclosure, some or all of the electricity produced by the second renewable energy system (e.g., a photovoltaic (PV) system) may be used to generate electricity and some of this energy may be used to heat a heat storage medium, such as to melt a metal or metalloid, so that high temperature energy (in the form of the latent heat of fusion from the molten metal or molten metalloid) can be stored in a suitable high temperature storage tank or vessel. Heat from the heat storage medium is used to heat a heat transfer gas to a high temperature which, in turn, is supplied to a superheater or the like to superheat the low/moderate temperature steam generated by the first renewable energy system. Accordingly, these two renewable energy systems are used to provide heat to form and to superheat steam in a common steam power cycle, where the energy storage capacity of both renewable systems is sufficient to provide anticipated power from the common steam power cycle over extended periods of time where energy from the renewable energy systems or sources may not be directly available, such as at night or when the wind fails to blow. The novel compartmentalization of the renewable energy plant of the present disclosure uses a combination of suitable renewable processes to independently generate intermediate/low temperature steam and to superheat it to a desired high temperature for driving a steam turbine in a common steam power cycle or system.

For example, and for illustration purposes, a first or low/moderate temperature renewable energy system, such as a CSP system, may be used to generate low/moderate temperature steam up to, for example, about 470° C. (878° F.). The remainder of the heat required to make high temperature superheated steam comes from a second or high temperature renewable energy system, such as a PV system or other renewable system that generates electricity. All or a portion of the electricity generated by the second renewable energy system is used to heat a second or high temperature working fluid (e.g., a high temperature heat transfer gas), where only a portion of the second renewable energy system need be designed and constructed to operate at very high temperatures (e.g., up to about 1,500° C. (about 2,732° F.)) thereby minimizing the overall cost of the power generation while also providing pathways to maximum efficiency and flexibility.

Other aspects, objects and features of the present disclosure will be in part disclosed hereinafter and will be apparent to those skilled in the art.

BRIEF DESCRIPTION OF THE DRAWINGS

Corresponding reference characters indicate corresponding parts throughout the drawings.

DESCRIPTION OF PREFERRED EMBODIMENTS

Figure 1:
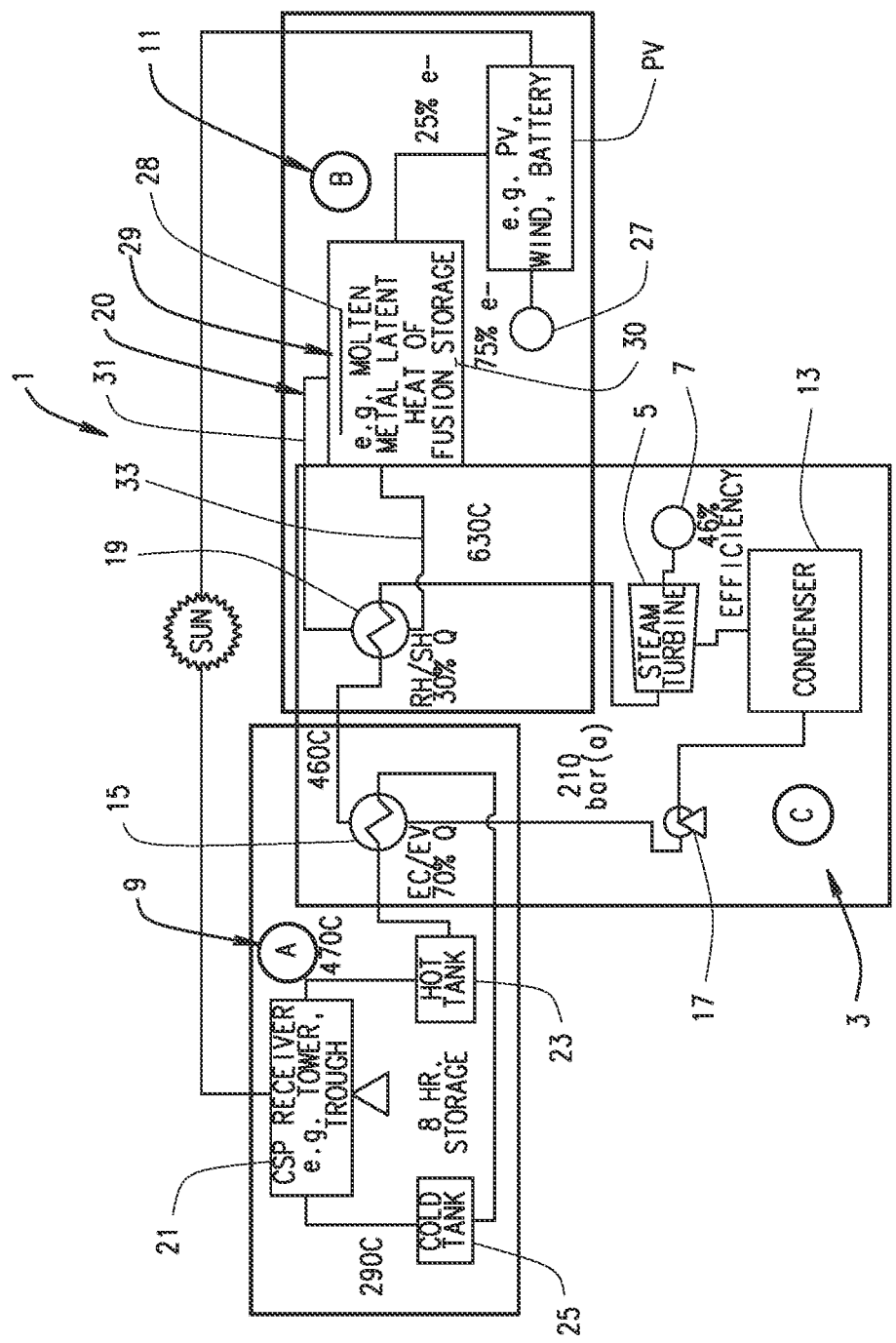
FIG. 1 is a diagrammatic view of a compartmentalized renewable power system of the present disclosure having a main power cycle system, as generally shown in Block C, comprising a steam turbine generator set that utilizes heat from a low/moderate concentrated solar power (or other renewable energy) system, as generally shown in Block A, having sufficient energy storage capability to heat an economizer/evaporator that supplies low/moderate temperature steam to a reheater/superheater where the low/moderate temperature steam is superheated by a high temperature working fluid (e.g., a heat transfer gas) that is heated by a second renewable energy system, as shown in Block B, where both the first and second renewable energy systems have sufficient heat storage capacity to run the system during periods when the renewable energy systems are inoperable for extended periods.

As shown in FIG. 1, a compartmentalized or segmented system of the present disclosure is indicated in its entirety at 1. This compartmentalization system comprises a main (or primary) steam powered electrical generation system, as generally indicated at 3 and as illustrated in Block C. High temperature, superheated steam is supplied to a steam turbine 5 (a prime mover), which, in turn, drives an electrical generator 7. The superheated steam is generated in part by a first or low/moderate temperature renewable energy system, as generally indicated at 9 (as shown in Block A) and, in part, is generated by a second or high temperature renewable energy system, as generally indicated at 11 (as shown of Block B). The first or low/moderate temperature renewable energy system 9 generates low/moderate temperature steam that is heated by the second or high temperature renewable energy system 11 to form high temperature superheated steam, which is delivered to steam turbine 5.

More specifically, in addition to the steam turbine 5 and the generator 7, the main or primary steam power electrical generation system 3 comprises a condenser 13 that receives low temperature steam and/or condensate from steam turbine 5. Liquid feedwater exiting condenser 13 is supplied to a low/moderate temperature economizer/evaporator 15 via a pump 17. As will be hereinafter described in detail, relatively low/moderate temperature heat from the first or low/moderate temperature renewable energy system 9 heats the feedwater in the economizer/evaporator 15 to form low/moderate temperature steam (e.g., at about 460° C. or 860° F.), which is then supplied to a reheater/superheater 19 where it is reheated and superheated to a relatively high temperature (e.g., about 630° C. or 1166° F.) by a high temperature portion 20 (as hereinafter described) of the second or high temperature renewable energy system 11. The heat transfer gas supplied to the superheater is heated, for example, to a sufficiently high temperature (e.g., from about 800° C.-1100° C. (1472° F.-2012° F.)) so that it will superheat the low/moderate temperature steam from economizer/evaporator 15 and supply superheated steam to turbine 5, so that the turbine operates most efficiently. It will be particularly noted that the entire first renewable energy system 9 operates at low/moderate temperatures such that all components and piping may be made from low/moderate temperature materials. Importantly, only the high temperature portion 20 of the second renewable energy system 11 operates at high temperature. This means that only the components of the high temperature portion 20 need be designed, engineered, and constructed of high temperature materials that reduce the construction and operating costs of the second renewable energy system. This holds down the cost of both the first renewable energy system and the second renewable energy system. As used herein the term "piping" is not limited to pipes, but also includes ducts, lines, conduits, channels, tubes, and other structures that are capable of transporting a working fluid, as would be understood by one with ordinary skill in the art. Still further, while the low/moderate temperature steam is reheated and superheated in reheater/superheater 19, within the broader aspects of this disclosure, it may not be necessary to reheat the low/moderate temperature steam, depending on the steam turbine, such that only a superheater is needed.

As shown in FIG. 1, the first or low/moderate temperature renewable energy system 9 is preferably a reduced temperature concentrated solar power (CSP) system that uses, for example, a multiplicity of heliostats (not shown, but which are well known by those skilled in the art) that are controlled to reflect sunlight onto a receiver 21 on top of a tower to heat a first working fluid to a low/moderate temperature, such as about 470° C. or 878° F. This first working fluid may be, for example, a molten salt that is well known and widely used in CSP systems that is circulated through and heated in the receiver. Over the course of the day while the sun is shining, the molten salt that is heated by the receiver to such low/moderate temperature (e.g., 470° C. or 878° F.) is stored in a hot tank (or other suitable storage vessel or reservoir) 23. Over the course of the day when the sun is or is not shining or at night, stored molten salt at such low/moderate temperature (e.g., 470° C.) may be withdrawn from hot tank 23 and supplied to economizer/evaporator 15 so as to heat and evaporate feedwater supplied by pump 17 to form a low/moderate temperature steam (e.g., at about 460° C. or 860° F.). The molten salt, after passing through economizer/evaporator 15, is stored in a cold tank 25 at a lower temperature (e.g., about 290° C. or 554° F.), where this lower temperature is sufficient to maintain the salt in a molten state. The quantity of molten salt stored in hot tank 23 is sufficient to supply low/moderate temperature energy to economizer/evaporator 15 both during the day when, for example, the sun can directly supply such low/moderate temperature energy to the economizer/evaporator 15 and when the sun is not shining for extended periods, such as at night or during bad weather. Those skilled in the art will recognize that hot tank 23 may be sized to hold larger or smaller quantities of such low/moderate temperature molten salt, depending on the length of time that the system is designed to operate when the sun is not shining and/or at night. After the low/moderate temperature molten salt has generated steam in the economizer/evaporator 15, the now lower temperature molten salt, which for example may be at about 290° C. (554° F.), is stored in a cold tank 25. When the sun is shining, the relatively cool, but still molten, salt in cold tank 25 is supplied to receiver 21 so that it may be reheated to its desired hot temperature (e.g., about 470° C., 878° F.) and stored in hot tank 23. Those skilled in the art will appreciate that the first renewable energy system 9 may be the heliostat system described above, or it may be a trough reflector solar system, another type of solar heat collection system, or a geothermal working fluid heating system may be used, or any other renewable heat source. Of course, tanks 23 and 25 are preferably insulated with suitable insulation.

The second or high temperature renewable energy system 11, as shown in Block B, preferably comprises a renewable energy electrical generating system, such as a photovoltaic (PV) system. However, other types of renewable energy electrical generation systems, such as wind turbine electric generators, hydroelectric electrical generating systems, or battery storage systems may be used in place of the photovoltaic (PV) system. For the photovoltaic (PV) system 11 shown in FIG. 1, a multiplicity of suitable PV solar panels (such as are well known in the art but are not shown in FIG. 1) are positioned to receive sunlight and to convert the sunlight into electricity. Of course, the problem with such a system is that electricity cannot be readily stored in large quantity for operation when the sun is not shining, such as on cloudy days or at night. In the second renewable energy system 11, all or only a part of the electricity generated by the PV renewable energy electric system may be fed directly into an energy grid 27 and/or a portion of the electricity generated may be used to power electric heaters 28 located within a heat storage tank (or other suitable storage vessel or reservoir) 29 containing a large quantity of a suitable high temperature heat storage medium, as indicated at 30. In a preferred embodiment, this high temperature heat storage medium 30 is a metal or metalloid that is melted by the heaters and maintained in a molten state within the heat storage tank. However, within the broader aspects of this disclosure, the heat storage medium need not be a molten metal or metalloid, but rather could be a quantity or mass of solid heat storage material, such as sand, rock, concrete, or a ceramic material. Such solid heat storage materials may not be at the relatively high temperature of a metalloid, such as molten silicon, but still has sufficient heat capacity to heat the working fluid to a temperature necessary to superheat the steam supplied to the steam turbine 5. In addition to being at a higher temperature, molten silicon heat storage material may require a smaller mass and require a smaller footprint than sold heat storage materials.

In this second renewable energy system 11, for example, about 75% of the electricity generated can be fed directly into an energy grid 27 and the remaining 25% may be used to power heaters 28 so as to heat and to maintain the temperature of the heat storage material 30 in tank or reservoir 29 at a desired level, whether the heat storage medium is a molten metal or molten metalloid, or is a solid heat storage material, such as sand, rock, concrete or ceramic. Of course, these percentages may vary between 100% being fed into the energy grid and 100% being used to power the electrical heaters in tank 29. Those skilled in the art will understand that electric heaters 28 may be electrical resistance heaters, induction coils, electric arc heaters such as are used in electric arc furnaces, microwave heaters, or other suitable electric heaters that are well known in the art.

In accordance with this disclosure, the high temperature heat storage material 30 in tank 29 is heated to a much higher temperature than the temperature of the molten salt in the hot tank 23 so that the high temperature heat storage material would heat a second working fluid (a high temperature heat transfer gas) to a sufficiently high temperature (e.g., about 800° C.-1100° C. (1472° F.-2012° F.)) sufficient to superheat the low/moderate temperature steam that is supplied to steam turbine 5. For example, the high temperature heat storage material in tank 29 could be heated to a range of about 1,000° C. (1832° F.) to about 1,500° C. (2,732° F.). Thus, the heat transfer gas is heated by the heat storage medium in heat storage tank 29 to a temperature sufficient to superheat the low/moderate temperature steam in reheater/superheater 19 such that superheated steam at a desired temperature can be supplied to steam turbine 5. This high temperature heat transfer gas is supplied to reheater/superheater 19 via a supply line 31 to superheat the low/moderate temperature steam from evaporator 15 and to supply superheated steam to steam turbine 5 in sufficient quantity and at a desired high temperature such that the steam turbine operates efficiently. The heat storage medium in tank 29 has a sufficiently high heat capacity and volume and is at a sufficiently high temperature to supply such superheated steam to steam turbine 5 for extended periods of time, such as when the sun is not shining or at night. In this disclosure the term "metalloid" is defined to mean a chemical element or other substance that exhibits some properties of metals and some of nonmetals.

As noted, a preferred high temperature heat storage material may preferably be a molten metal or metalloid. Some common examples of molten metals or metalloids that may, within the broader aspects of the present disclosure include, but are not limited to, metals or metalloids such as sodium, tin, lead, and alloys thereof, such as lead-bismuth eutectic or LBE or metalloids such as boron, silicon, germanium, arsenic, antimony, tellurium, and polonium. In particular, a preferred high temperature heat storage material is molten silicon. As noted above, within the broader aspects of this disclosure, the heat transfer medium need not be a molten metal or metalloid, but rather could be a mass of sand, rock, concrete or ceramic material heated to a high temperature by electric heaters 28 and stored in tank or reservoir 29.

In accordance with the present disclosure, the high temperature heat transfer working fluid is, preferably, a heat transfer gas such as air, nitrogen, $CO_2$, or an inert gas and is circulated so as to be in heat transfer relation with the heat storage material in storage tank 29 to be heated by the heat storage material therein. The heated heat transfer gas then flows through reheater/superheater 19 to superheat the low/moderate temperature steam from economizer/evaporator 15. The heat transfer gas is preferably, but not necessarily, pressurized to a relatively low pressure, for example, about 20-40 inches of a water column or the like, but those skilled in the art will understand that this gas can be pressurized to any desired pressure, positive or vacuum. A suitable high temperature blower or pump (not shown in FIG. 1) is used to circulate the heat transfer gas so as to be in heat transfer relation with the high temperature heat storage medium 30 in heat storage tank 29. The heat transfer gas is supplied to the reheater/superheater 19 at a sufficiently high temperature and in sufficient quantity so as to superheat the low/moderate temperature steam from economizer/evaporator 15, which is supplied to steam turbine 5. The heat transfer gas is returned to tank 29 via a return line 33 for again being heated by the heat storage material in tank 29. In this manner, it will be appreciated that only the high temperature portion 20 of the second renewable energy system 11 need be engineered and constructed of high temperature materials to withstand the high temperature of the high temperature heat storage material in tank 29. Specifically, the high temperature portion 20 includes tank 29, the heaters 28 in tank 29, and the supply piping 31 that circulates the high temperature heat transfer gas from tank 29 to the reheater/superheater 19. Depending on the construction and operation of the reheater/superheater 19, the latter may not need to be constructed of such high temperature materials because it is, in effect, cooled by the incoming low/moderate temperature steam from the economizer/evaporator 15. Likewise, the return line 33 need not be constructed of high temperature materials. It will also be appreciated that by using such a heat transfer gas, there is no danger of the heat transfer gas "freezing" in the high temperature portion 20 of the second renewable energy system in the event of an extended shut down.

Preferably, but not necessarily, the heat storage medium is molten silicon (Si). The melting point of silicon is 1,414° C. (2,577° F.) and the boiling point is 2,355° C. (4,270° F.), thus resulting in a wide temperature range in its molten state. In accordance with the present disclosure, while there may be some sensible heating of the molten silicon above its melting point, the additional heat storage due to this possible sensible heating typically would be relatively small when compared to the storage of heat due to the metal's or metalloid's latent heat of fusion, as hereinafter described. It will be appreciated that when the heat transfer gas is heated by the molten silicon in tank 29 during extended periods, the temperature of the silicon may drop to its freezing point without causing solidification of the silicon. This is due to the large latent heat capacity of silicon. It is also recognized that molten silicon will chemically react with oxygen and other materials. For that reason, tank 29 is preferably sealed and/or filled with a non-oxidizing gas, such as nitrogen, or an inert gas, such as helium or argon, so that the molten metal or metalloid therein is not exposed to the atmosphere. Also, it is preferable that the heat transfer gas is not in direct contact with the molten metal or metalloid heat storage medium in tank 29 to reduce oxidation or other chemical degradation of the molten heat storage medium. Of course, if a solid heat storage medium, such as rock, sand, concrete, or a ceramic material, is used, oxidation may not be an issue.

The "latent heat of fusion" is the amount of heat that must be supplied to a solid body of a material heated to its melting point to change it from a solid to a liquid. The specific latent heat (L) of a material is a measure of the heat energy (Q) per unit mass (m) released or absorbed during a phase change, and is referred to as the "latent heat of fusion" of the material, and is usually expressed in the SI units as joules per mol [J/mol]. The melting temperature of silicon is about 1414° C. (2577° F.), and the latent heat of fusion of silicon is 50.55 kJ/mol and the latent heat of vaporization of silicon is 384.22 kJ/mol. Importantly, silicon's heat of fusion (50.55 kJ/mol) is quite large compared to other metals that may be stored in a liquid state. For example, the heat of fusion of lead (Pb) is 4.799 kJ/mol and the latent heat of fusion of tin (Sn) is 7.322 kJ/mol. The latent heat for a given mass of a substance is calculated by $Q=m \times L$ where:

Q is the amount of energy released or absorbed during the change of phase of the substance (in kJ or in BTU), M is the mass of the substance (in kg or in lb.), and L is the latent heat of fusion for a particular substance. The high latent heat of fusion of silicon is advantageous because a relatively small mass of material can store more energy than a comparable mass of other metalloids or metals. This lowers the cost of the system by requiring less mass of the high temperature heat storage medium and decreases the size of tank 29. Even with a smaller mass of the heat storage medium as may be achieved through the use of molten silicon or the like, the flowrate and temperature of the heat transfer gas that is supplied to reheater/superheater 19 is adjusted based on the temperature of the heat storage medium so as to superheat a desired quantity of superheated steam that is supplied to steam turbine 5 over extended periods, such as when energy from the second renewable energy system 11 is not available. It will be appreciated that if in place of molten silicon a solid heat storage medium is employed, such as rock, concrete, ceramic, or sand, the temperature of the heat storage medium will be lower than molten silicon such that the flow rate of the lower temperature heat transfer gas must be increased. Further, it will be understood that the temperature of the heat transfer gas heated by the solid heat storage material must nevertheless be well above the temperature of the superheated steam to be produced in reheater/superheater 19.

Referring to FIG. 1, for the second renewable energy system 11, as shown in Block B, the heat storage medium is preferably a molten metal or metalloid and more preferably molten silicon that is stored in high temperature tank 29. Heat is generated in the tank 29 by means of electric resistance heaters 28 to melt the metal or metalloid heat storage medium to a molten state and to maintain it in its molten state. A suitable heat transfer working medium, preferably a low pressure heat transfer gas (air, $CO_2$, nitrogen ($N_2$), or another inert gas) is circulated so as to be in heat transfer relation with the high temperature molten metal or metalloid heat storage medium in tank 29. In this manner, the heat transfer gas is heated to a sufficiently high temperature (e.g., 1000° C. or 1832° F.) such that when it is circulated by way of a supply line 31 from tank 29 to reheater/superheater 19, the hot gas will superheat the low/moderate temperature steam supplied to the reheater/superheater 19 by the economizer/evaporator 15. As the heat transfer gas flows through the reheater/superheater 19, it preferably reheats and superheats the low/moderate temperature steam and supplies superheated steam to turbine 5 in the quantity, temperature, and pressure needed for efficient operation of the turbine. However, those skilled in the art will recognize that it is only necessary that, in accord with the present disclosure, the low/moderate temperature steam need be superheated without being reheated. The heat transfer gas exits the superheater and is recirculated or returned to tank 29 via a return line 33 to be reheated by the molten metal or metalloid heat storage medium in the tank. In this manner heat is transferred from the hot heat storage medium in tank 29 to reheater/superheater 19. It will be appreciated that because of the high latent heat of fusion of the heat storage medium, and particularly of molten silicon, that large quantities of heat may be removed from the heat storage medium without a change of state from a liquid to a solid.

As noted, tank 29 and supply piping 31 constitute the high temperature portion 20 of the second renewable energy system 11. However, depending on the application and the operating conditions, the high temperature portion may also include the reheater/superheater 19 and the return piping 33. In accordance with the present disclosure, only the high temperature portion 20 need be designed and fabricated from high temperature materials. Because the heat transfer gas is preferably at a relatively low pressure, as described above, the high temperature portion 20 and its components (including piping, blowers, valves and the like) operate at a low pressure, such that these high temperature components need not withstand unduly high internal pressures. Those skilled in the art will appreciate that only the high temperature portion 20 of the second renewable energy system 11 need be designed and fabricated from high temperature (and thus expensive) materials, such as Inconel® alloys or the like. It will also be appreciated that if the molten metal or metalloid heat storage medium is silicon, nitrogen, an inert gas, or a mixture thereof may be the preferred heat transfer gas so as to minimize dissociation of any reactive gases in such mixture, and/or to minimize oxidation of the silicon. However, for other molten metals or metalloids or for solid heat storage materials (e.g., sand, rock, concrete or ceramic materials or the like) that are cooler than molten silicon, and/or are not as oxidization prone, air may be a suitable heat transfer gas. It will be appreciated that if a lower temperature heat storage medium is employed that stores heat at a temperature lower than the melting temperature of, for example, molten silicon, the temperature of the heat transfer gas delivered to the reheater/superheater 19 may be lower than if it were heated by molten silicon. In such cases, the temperature of the heat transfer gas must be well above the desired superheated temperature of the steam delivered to the steam turbine and the mass flow of the lower temperature heat transfer gas heated by such lower temperature heat storage medium must be increased so as to superheat the desired quantity of steam in reheater/superheater 19.

It will be appreciated by those skilled in the art that the single reheat steam/water electrical power generation system 3 shown in FIG. 1 can be replaced by multiple reheat subcritical steam/water power cycles, by multiple reheat supercritical steam/water power cycles, or by multiple reheat ultra-subcritical steam/water power cycles.

In operation, the low/moderate temperature renewable energy system 9 of the compartmentalization system 1 of this disclosure generates low/moderate temperature steam within economizer/evaporator 15, which is then supplied to reheater/superheater 19 where it is reheated and superheated (or merely superheated) by the high temperature heat transfer gas, which is heated by the heat storage medium in tank 29, and which is delivered to the reheater/superheater 19 via supply piping 31 to superheat the low/moderate temperature steam. As previously mentioned, the heat storage medium is preferably silicon, which is heated to a molten state by electrical energy generated by the second renewable energy system 11. However, within the broader aspects of this disclosure, the heat storage medium can be a lower temperature a solid material such as sand, rocks, concrete, or ceramic material. If such a lower temperature heat storage material is used, it may not be necessary to construct the tank 29 and supply piping 31 from high temperature materials. However, the system and method of the present disclosure nevertheless has a distinct advantage over other systems in that a large part of the heat necessary to supply superheated steam to the turbine 5 is provided by the lower temperature renewable energy system and that the second renewable energy system 11 need only supply the high temperature heat required to reheat/superheat the low/moderate temperature steam produced by the first renewable energy system.

The heat transfer gas is heated to a sufficiently high temperature by the heat storage medium in tank 29 such that the heat transfer gas is delivered via supply line 31 to the reheater/superheater 19 where it reheats and superheats (or merely superheats) the low/moderate temperature steam supplied to reheater/superheater 19 so as to supply superheated steam at a desired temperature (e.g., at about 630° C. or 1166° F.) to turbine 5. The heat transfer gas exiting the superheater is returned to be reheated by the heat storage medium in tank 29 by means of return piping 33. Because only the hot portion 20 of the second renewable energy system 11 may need to be designed and constructed of high temperature materials and because the heat storage tank 29 and its associated piping and components (e.g., valves and pumps) operate at low pressure, the overall cost of system 11 can be reduced and it will have improved service life and significantly reduced maintenance and operational costs for the entire compartmentalized system 1. As noted, in accord with the present disclosure, it may not be necessary to reheat the low/moderate temperature stream depending on the steam cycle and turbine selected.

There can also be a low temperature sub-system (not shown in FIG. 1) of any of the above energy sources of, for example, a HRSG providing heat to the low temperature portion(s) of the power generation cycle, mainly, as examples, to the high pressure (HP) feedwater heating in a steam/water cycle, to intermediate and/or low pressure levels of steam generation added in some instances in a steam/water cycle when it is practical to increase overall efficiency, as a heat source for "recuperation" or other portions of a $CO_2$ cycle, for direct power generation for example in a low temperature $CO_2$ cycle, or in an organic Rankine cycle system.

Another useful advantage of the compartmentalized system 1 of the present disclosure, in addition to generating useful power in the main power cycle system 3 (as indicated at Block C), is to use heat generated in either of the renewable energy systems in other processes, such as water desalination, chemical and/or petrochemical processes, refinery processes, or district heating, etc. Useful heat can be exported utilizing any working fluid desired such as heat transfer fluid, steam/water, etc.

Still further, those skilled in the art will recognize that the compartmentalized system 1 of the present disclosure minimizes costs of the first or the CSP renewable energy system 9 by allowing it to operate a low/moderate temperature because only the high temperature portion 20 of the second renewable energy system 11 need be heated to the high temperature needed to reheat/superheat the low/moderate temperature steam generated by the first renewable energy system. This allows the entire first renewable energy system 9 of the present disclosure to use low cost carbon steels and lower cost steels or stainless steels for its components, thus lowering the cost of the first renewable energy system. Current technology high temperature materials, such as Inconel® alloys and high temperature stainless-steel materials, are expensive and are sometimes more difficult to fabricate. In accord with the present disclosure, these expensive materials are only needed for the high temperature portion 20 of the second renewable energy system 11, namely, for the hot tank 29, and the supply piping 31 and, for the other components included therein connecting the heat transfer gas with the heat storage medium in tank 29 and the reheater/superheater 19. It will be appreciated that in the preferred embodiment of this disclosure that uses molten silicon as the heat storage medium, the reheater/superheater 19 may not need to be made of high temperature materials because it is cooled by the low/moderate temperature steam that is being superheated. This minimizes the overall cost of system 1. However, because a portion (even a large portion) of the electrical energy generated by renewable system 11 can be sold to the commercial grid, it is not necessary that this system be minimized. Because the high temperature heat in the high temperature portion 20 of system 11 is generated by the above-disclosed electric heaters 28, the size and therefore the cost of the second renewable energy system 11 is minimized because high temperature materials, such as Inconel, are required only for the high temperature portion 20 of the second renewable energy system. This minimizes the overall cost of the plant. The high temperature heat storage media, methods, and costs, overall electricity and/or heat export, storage capacities, etc. can be optimized as well.

In addition, those skilled in the art will recognize the operating temperature of the first renewable energy system 9 need not be so high as to superheat the steam supplied to steam turbine 5. In this manner, all of the components and piping for system 9 may be made of lower temperature materials, which reduces the overall construction and operating costs.

It will be further understood that in order to further increase efficiency of power system 3, as shown in Block C, it is necessary (or highly desirable) to supply high temperature superheated steam to steam turbine 5. However, prior art renewable energy systems are available, as in FIG. 2, that have sufficient temperature and heat capacity to superheat the steam required to efficiently power a steam turbine were designed to handle the high temperature working fluid from the source (e.g., from the receiver), to the storage tank and to the superheater. This resulted in a system that required the use of even more expensive high temperature metals to tolerate the high temperature working fluid, and required even larger heliostat fields and the like. Some of the equipment (e.g., high temperature working fluid pumps, etc.) for use with these high temperatures and at the scales required for power generation may not yet be available and would need to be developed. The cost of such high temperature equipment would be very high and may well be cost prohibitive.

In contrast, with the use of a compartmentalized renewable energy system 1 of the present disclosure, only a portion of the high temperature portion 20 of the second renewable energy system 11 need be designed and engineered to handle the high temperature working fluid needed to superheat steam that is supplied to the steam turbine. This results in large cost savings, improves efficiency, and minimizes operational and maintenance costs of the overall system 1 of the present disclosure.

It will also be recognized by those skilled in the art that in the current renewable power generation market, it is generally accepted that PV renewable energy systems constitute a relatively inexpensive method for the generation of electricity. It is also generally accepted that the costs associated with PV generation will continue to decrease with advances in methods, materials, efficiency of energy conversion to electricity, etc. For this reason, it is desirable to replace the highest temperature portion of a standard CSP plant (e.g., as in FIG. 2) with high temperature heat generation by means of heat from a PV (or other electrical generation) renewable energy system, as herein disclosed. Still further, those skilled in the art will recognize that high temperature heat storage systems, such as latent heat of fusion of molten metal or metalloid heat storage mediums or working fluids are relatively inexpensive and are currently available. Utilizing the lower cost PV electricity to heat the working fluid in such a high temperature heat storage system, such as in hot tank 29, provides a relatively low-cost path to provide high temperature heat to the power generation cycle without the need for the generation of the high temperature working fluid in the entire CSP renewable energy system 9 (as in FIG. 2). This can result in greatly reduced cost for heat from the CSP portion of the system and thus allows the use of lower grade working fluids (e.g., molten salt) in the low/moderate or first renewable energy system 9 and allows the fabrication of components and piping form lower temperature, lower cost materials.

Still further, in accord with the current disclosure, there will likely be a reduction in the size of the heliostat field of the CSP system, which will reduce the size and cost of the heliostat system. This results in a substantial cost savings of the CSP cycle by using a compartmentalized renewable energy system that comprises a first or low/moderate temperature system 9 to generate low/moderate temperature steam and then that uses a second renewable energy system 11, such as a photovoltaic (PV) and/or other renewable energy electrical generation system, that heats a heat storage medium (e.g., molten silicon or the like) to a high temperature and stores the high temperature heat storage medium in hot tank 29. It will be understood that there is a sufficient quantity of the heat storage medium in tank 29 to not only heat the heat transfer gas to a sufficiently high temperature to superheat the low/moderate temperature steam produced by the first or lower temperature renewable energy system while the second renewable energy system is operating and for extended periods when the second renewable energy system is inoperable, such as at night or the like when the sun is not shining.

As will be understood by those skilled in the art, prior art CSP systems attempt to raise overall efficiency of the power generation cycle by raising the temperature entering and throughout much the system. As noted, this requires the use of high temperature and high cost materials to handle these high temperatures, and thus requires a large heliostat field to generate sufficient receiver working fluid mass flow at high temperature to heat the more efficient power generation cycle.

Figure 2:
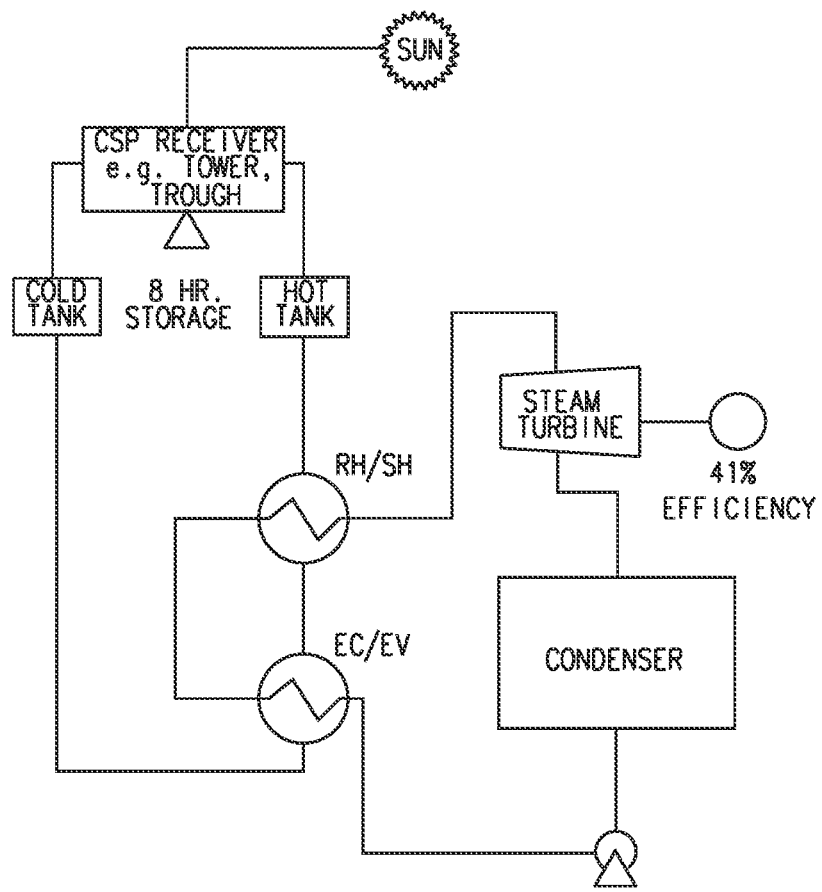
FIG. 2 is a schematic diagram of a prior art renewable power system where heat from a concentrated solar power (CSP) system heats a suitable working fluid, such as a suitable molten salt, is stored in a hot storage tank and hot working fluid is withdrawn from the tank to heat low/moderate temperature steam in a reheater/superheater and supplies superheated steam to a steam turbine, and where the molten salt exiting the reheater/superheater is supplied to an economizer/evaporator that heats condensate from the steam turbine before it is supplied to the superheater, and where the relatively cool molten salt from the economizer/evaporator is sent to a cold tank where it will be recirculated through the CSP system when the CSP system is operative. The hot tank stores sufficient molten salt to power the system when heat from the renewable power system is not available.

Power Generation Cycle: FIG. 1 presents an example steam/waterpower generation cycle which in this case couples the two compartments or segments of solar heat generation, CSP and PV, together providing heat to separate portions of a common power cycle. As shown in FIG. 2, a standard (prior art) CSP steam/water cycle for comparison/ contrast. In FIG. 2, the working fluid from the solar receiver via the hot tank is processed through the steam/water heating sections of the steam/waterpower cycle in a series arrangement and returns to the cold tank for delivery back to the solar receiver for heating. This requires the CSP system to heat the steam to a sufficient temperature and pressure to supply the required quantity of superheated steam and to deliver superheated steam to the steam turbine. This requires the portions of the CSP receiver, the piping connecting the CSP receiver to the hot tank, and the piping from the hot tank to the reheater/superheater to be designed and constructed of high temperature materials. As it may be some distance from the receiver to the hot tank and from the hot tank to the reheater/superheater, a considerable portion of the system must be constructed of such high temperature materials, such as Inconel® alloys or the like.

The power generating cycle could also be a sub-, trans-, and/or super-critical $CO_2$ power cycle, an ORC, or perhaps one of many other options wherein a second power cycle working fluid receives the heat from the original solar receiver working fluid in a manner useful in the generation of heat and/or power.

While the above described compartmentalized system 1 with the described main power system 3 and the two compartmentalized renewable energy systems 9 and 11 may be preferred, it will be seen that a "power tower" CSP could be replaced with a "trough-type" CSP system. Further, the PV system described in regard to the second renewable energy system 11 could be replaced with a wind, hydro, or geothermal electrical generation system where a portion of the electricity generated by, for example, the wind system is used to heat the high temperature molten metal working fluid in tank 29 in place of the PV system shown in FIG. 1. In such a system using wind, the hot tank 29 would store a sufficient quantity of the hot heat storage medium (e.g., a molten metal or molten metalloid) so that it could be used to generate high temperature, superheated steam in reheater/superheater 19 during periods when sufficient wind is not available. Of course, a suitable battery electricity storage system could be used in place of tank 29 and the molten metal heat storage medium, or such a battery storage system could be used for additional heat storage or for backup purposes. Of course, if the second renewable system 11 is a hydroelectric or geothermal electrical generating system, the size or even the need for a heat storage medium could be reduced or eliminated and the heat transfer gas could be directly heated by electric heaters. Different combinations of PV, wind and battery backup can be used. Still further, different forms of renewable energy systems such as hydroelectric, geothermal, fuel cells, pumped storage, and different forms of thermal storage can be used.

Still further, those skilled in the art will recognize that the single reheat steam/water electrical power generation system 3 shown in FIG. 1 can be replaced for example by multiple reheat subcritical steam/water power cycles, by multiple reheat supercritical steam/water power cycles, or by multiple reheat ultra-subcritical steam/water power cycles, and/or by:
  a. Along with the high pressure (HP) and reheat (RH) steam systems discussed, intermediate pressure (IP) and/or low pressure (LP) steam systems may be added.
  b. Add other system heaters for process, etc. such that useful heat is exported in addition to power.
  c. Sub-, super-critical, mixed pressure $CO_2$ cycles with and/or without e.g. recuperation, intercooling, supercharging, all other cycle configurations.
  d. ORC cycles with and/or without e.g. recuperation, intercooling, supercharging, all other cycle configurations, combinations, and permutations of the above.

As seen in FIG. 2, conventional CSP power and/or heat generation and storage facilities generally are of the form where the heliostat field focuses solar radiation to the receiver containing a CSP working fluid which is heated with the receiver's absorbed energy. Current plants utilize a power cycle working fluid of steam/water to absorb heat from the CSP working fluid from the hot tank and deliver the fluid back to the cold tank for reheating of the CSP working fluid in the receiver. In order to raise the efficiency of the power cycle, the pressure and temperature of the power cycle working fluid are maximized within the available equipment design capabilities. To maximize the power cycle working fluid temperature necessitates that the CSP working fluid must be at a very high temperature as well, in fact a higher temperature than that desired for the power cycle working fluid.

Frequent relatively massive (at least relative to conventional fossil fuel plants) load changes especially with alternating sun and cloud can result in significant life-cycle utilization in a small timespan. This can lead to quick fatigue failures especially in the thick tube/sheet shell-and-tube heat exchangers (HXs) currently typically used in CSP applications for the molten salt to steam/water heat exchangers.

Compounding this is the nature of solar heat availability which can disappear substantially "instantly" as clouds pass between the solar position and the heliostat field position. This will result in rapidly changing mass flows and temperatures of both the CSP working fluid and the power cycle working fluid. Given that currently the heat is generally transferred between the two working fluids using shell-and-tube heat exchangers, the life cycle impact of these operating temperature differential gradients must be considered. Due to the typically high operating pressures and temperatures of the power cycle working fluid these shell-and-tube heat exchangers must have very specialized designs and/or suffer from low-cycle fatigue failures. The current state of CSP receivers is such that they have nearly reached the peak temperature that the shell-and-tube heat exchangers can successfully tolerate. Similarly, with the CSP working fluid and power cycle working fluid temperatures, the pressure of the power cycle working fluid (PCWF) has also basically reached a maximum for the current style of CSP plant. The worst issues are in the HPSHTR bundles where the temperatures are at their highest and the power cycle working fluid pressure remains very high. There have been issues with storage especially in the hot tank. Increases in salt temperature and the use of salts capable of sustaining these higher temperatures has the capability to drive up material and molten salt costs, and further compound issues with the shell-and-tube heat exchangers.

Current technology relies on CSP molten salt outlet/hot temperature for efficiency in the power cycle. Raising this hot molten salt temperature is very costly due to two main factors: 1. The receiver material and molten salt species must be elevated to materials and salts that can operate at higher temperatures; 2. The addition of significant active area to the heliostat field. Both of the above factors add significant cost to the overall CSP power generation facility. Additional cost increases will be those associated with increasing to higher alloy materials of piping, molten salt tanks, pumps, and other peripherals. A significant technological challenge exists with the current molten salt to steam/water shell and tube heat exchanger arrangement used to raise the steam for the power generation Rankine cycle. There are other types of heat transfer that can be employed, but at significant cost increase.

Utilizing inexpensive PV coupled with inexpensive high temperature molten metal or metalloid latent heat energy storage, circumvents the need to further increase the salt temperature thereby avoiding all the attending issues.

Figure 3:
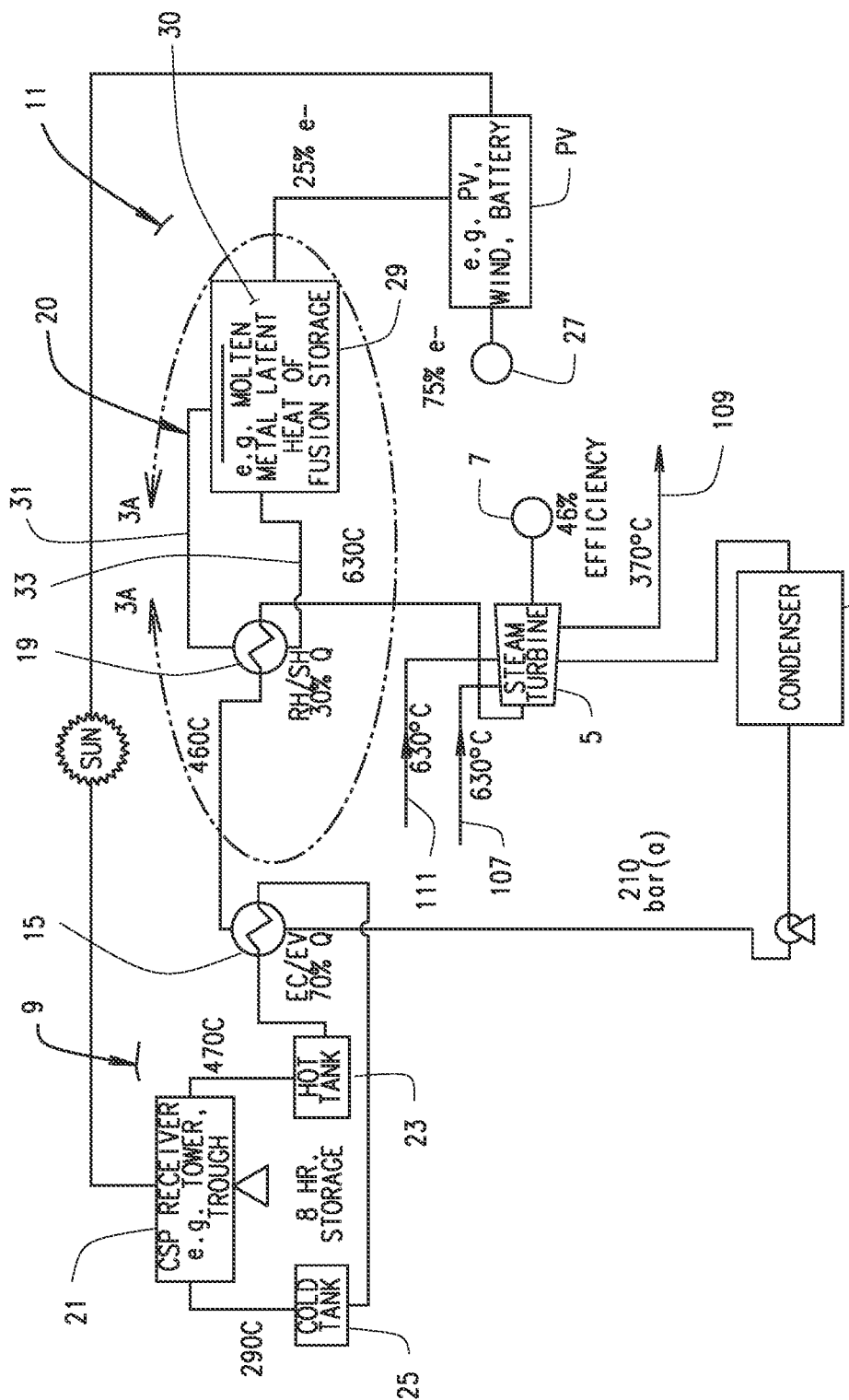
FIG. 3 is similar to FIG. 1 further illustrating the power system of the present disclosure, as shown in view FIG. 1.
Figure 3A:
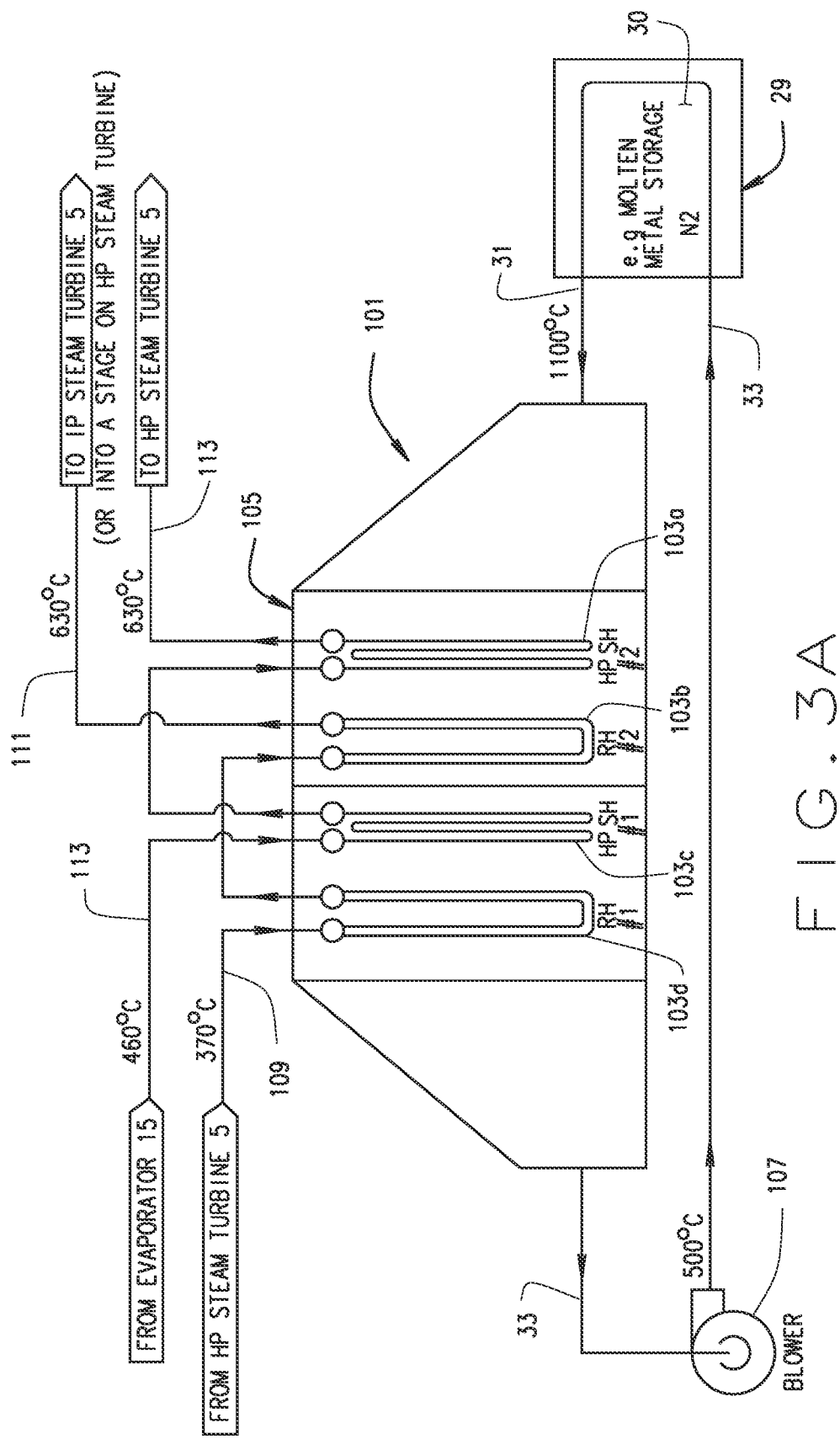
FIG. 3A is an illustration of a portion of FIG. 3 taken along line 3A-3A having a heat recovery steam generator-like (HRSG-like) arrangement, as generally indicated at 101, incorporated into the power system, the HRSG-like arrangement having one or more coils within a gas-tight casing or housing in which the coils within the HRSG-like arrangement are heated by a high temperature working fluid heated by a molten metal heat storage medium stored in the high temperature heat storage tank 29 which, in turn, is heated by the second renewable energy recovery system 11.

Referring now to FIG. 3A, a heat recovery steam generator-like (HRSG) assembly, as generally indicated at 101, is shown to be an alternate or expanded embodiment of the reheater/superheater 19, as shown in FIG. 1. More particularly, assembly 101 is supplied with heat from the second renewable energy system 11, as shown in FIGS. 1 and 3, for heating one or more coils, as, for example, indicated at 103a, 103b, 103c and 103d, located within an enclosed housing 105 of the HRSG-like apparatus. It will be appreciated that, in accord with the present description, fewer or more coils for the same or for different purposes may be provided in housing 105. As shown in FIG. 3A, a working fluid, such as nitrogen gas, is heated by the high temperature heat storage material 30 (e.g., molten metal or metalloid) in high temperature storage tank 29, which is heated by the second renewable energy system 11 by electric heaters 28, as above described. The working fluid exits tank 29 at a sufficiently high temperature and at a sufficiently high mass flow rate via line 31 so as to heat the above-mentioned coils 103a, . . . , 103d and the fluids therein for purposes as will be described. Of course, as the working fluid flows through housing 105, the thermal energy in the working fluid is transferred to the coils which cool the working fluid as it flows past each of the coils. The working fluid exits housing 105 and a high temperature blower 107 returns the working fluid to tank 29 via line 33 for being reheated by the heat storage medium 30 in the tank 29. As shown, the temperature of the working fluid leaving tank 29 may, for example, be about 1100° C. and the temperature of the working fluid exiting blower 107 may be about 500° C., but these temperatures are only exemplary and may vary considerably depending on the circumstances.

As further shown in FIG. 3A, coil 103d receives steam from the high pressure stage of turbine 5 via a line 109 at a temperature of about 370° C. and it is reheated by the working fluid flowing through heat recovery steam generator-like (HRSG) assembly 101 past coil 103d. The reheated steam from coil 103d is supplied to the inlet of coil 103b upstream of coil 103d where it is superheated to about 630° C., which is then supplied via a line 111 to the intermediate pressure stage of steam turbine 5. Alternatively, the steam exiting coil 103b may be supplied to a high pressure stage of the steam turbine 5. Still further, steam from evaporator 15 is supplied via a line 113 to the inlet of coil 103c, which functions as a first high pressure superheater. Superheated steam exiting coil 103c is supplied to the inlet of coil 103a for being further superheated by the incoming hot working fluid (which is at its highest temperature) as it encounters coil 103a. The superheated steam from the outlet of coil 103a is delivered to the high pressure stage of turbine 5 by a line 113.

Figure 4:
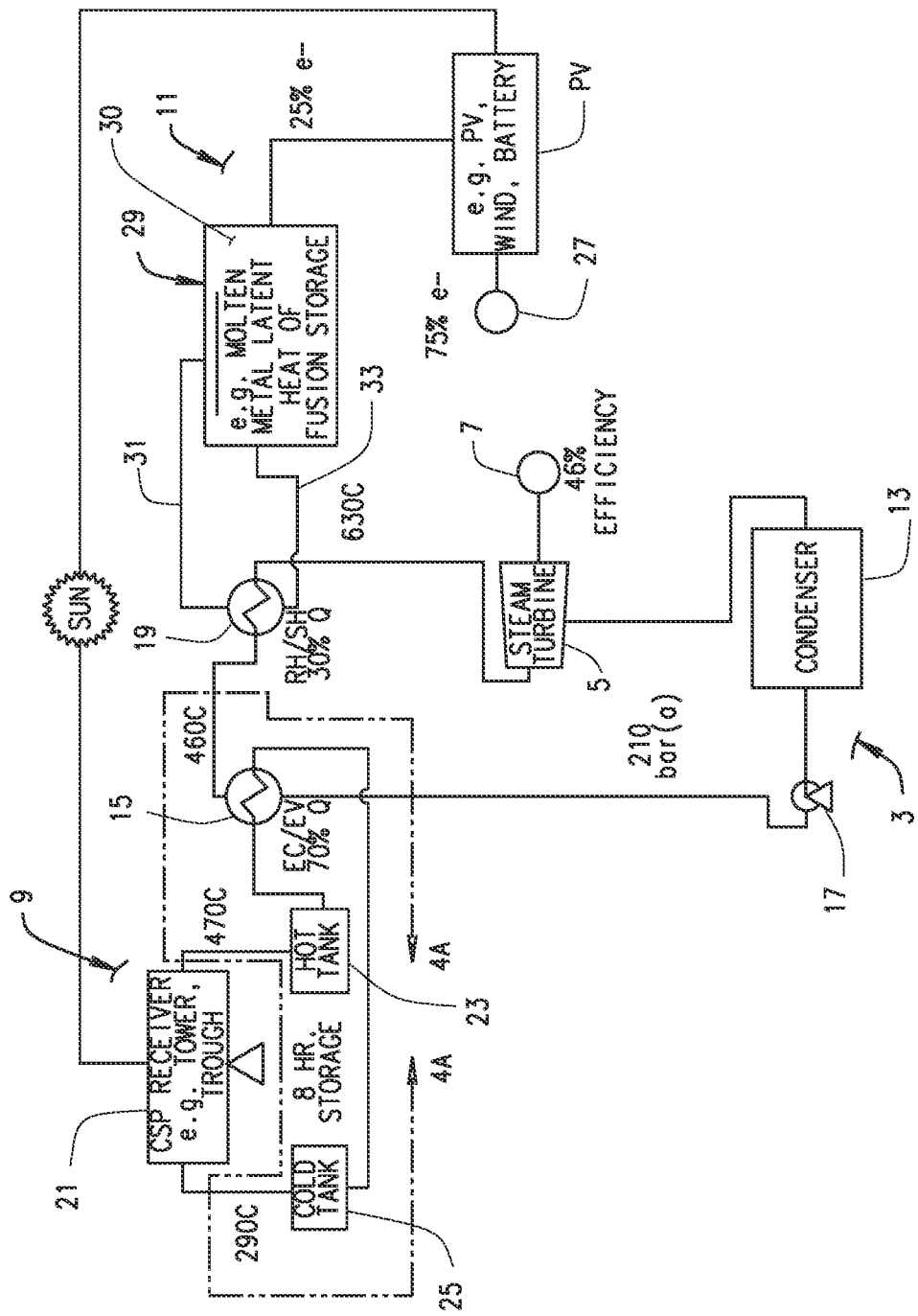
FIG. 4 is similar to FIG. 1 illustrating the power system, as shown in view FIG. 1.
Figure 4A:
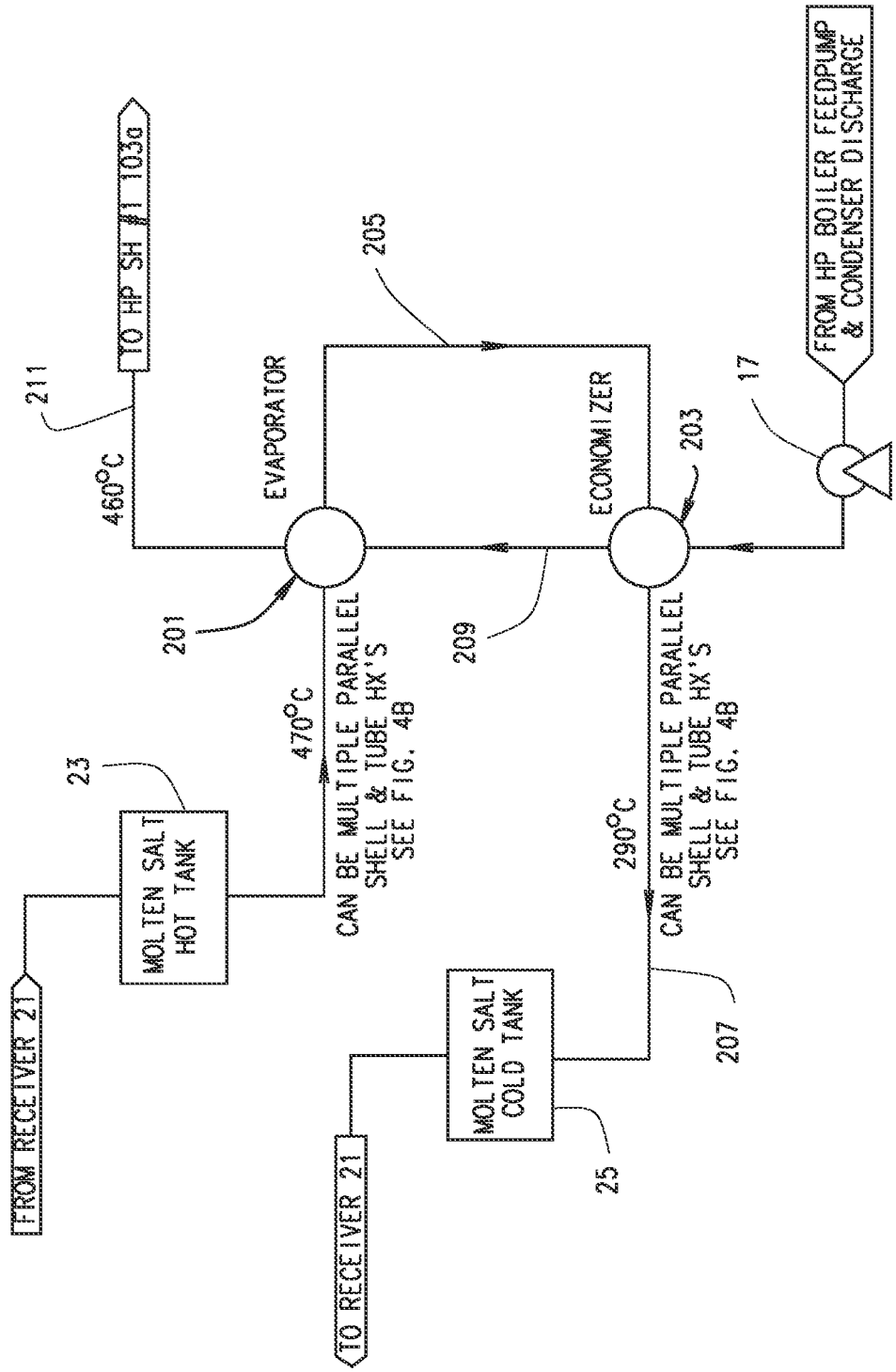
FIG. 4A is an illustration of a portion of FIG. 4 taken along line 4A-4A, as shown in FIG. 4, illustrating certain components heated by the first renewable energy system 9 further having a heat exchanger interposed between the discharge from the high pressure condensate pump 17 and the evaporator 15 configured to aid the molten salt from hot tank 23 to supply steam to reheater/superheater 19.
Figure 4B:
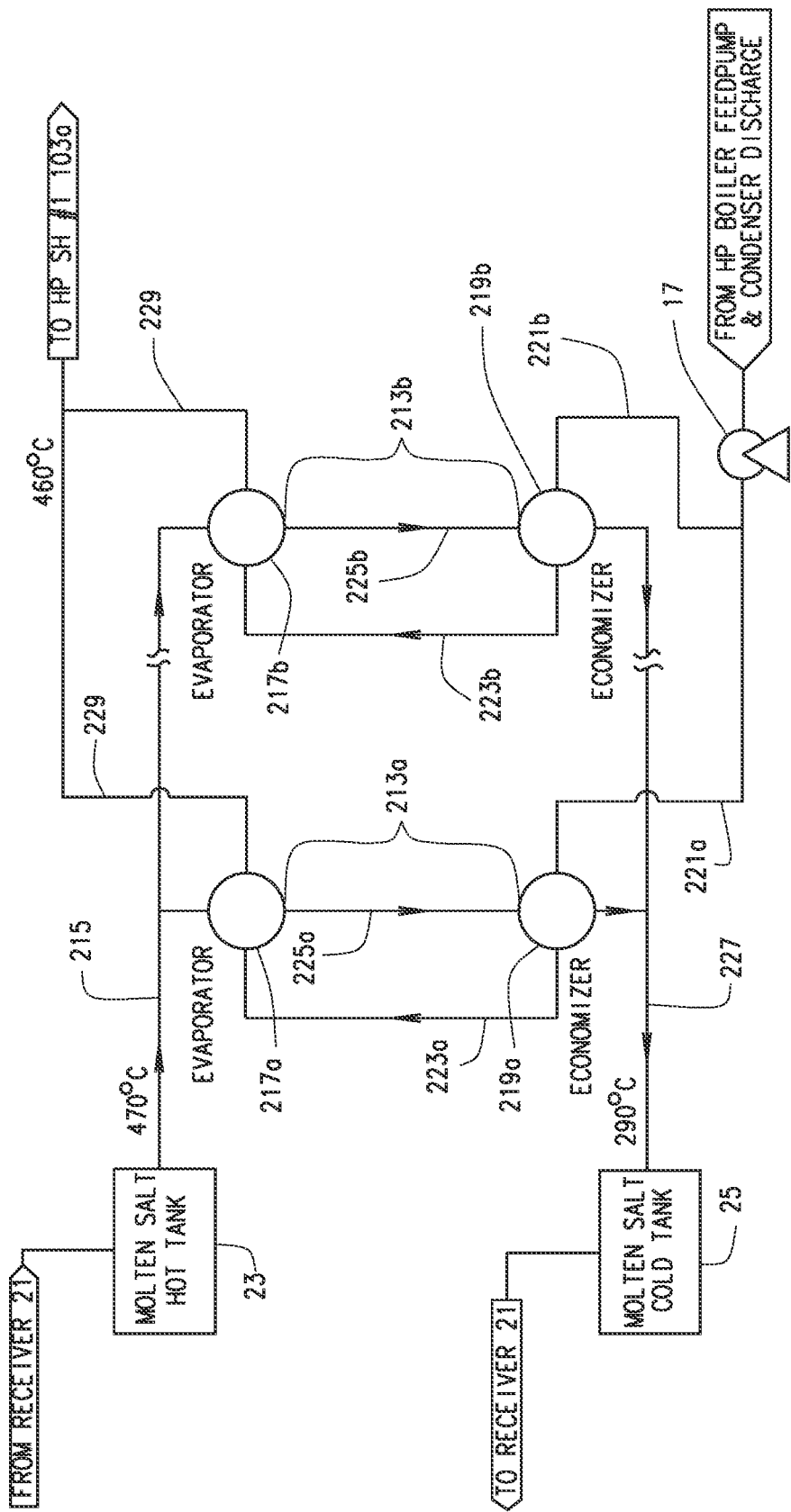
FIG. 4B is an illustration of the economizer/evaporator of FIG. 4A wherein the evaporator and economizer have multiple parallel shell and tube heat exchangers (HXs)

In FIGS. 4, 4A, and 4B, the economizer/evaporator 15 of FIGS. 1 and 3 is shown in greater detail to comprise an evaporator 201 and an economizer 203. Molten salt from hot tank 23 enters evaporator 201 at about 470° C. and is discharged from the evaporator and is delivered to economizer 203 by a line 205 at a lower temperature, but still well above the temperature of the feedwater and condensate supplied by pump 17 to the economizer 203. The feedwater and/or condensate supplied to economizer 203 by pump 17 from condenser 13 is at a lower temperature than the molten salt exiting evaporator 201 that flows via line 205 to economizer 203. As shown in FIG. 4A, the feedwater and/or condensate is heated by the molten salt in the economizer 203. The molten salt is returned via a line 207 to cold tank 25 at a temperature of about 290° C. The feedwater heated in economizer 203 is supplied via a line 209 to evaporator 201. The steam from evaporator 201 is supplied via a line 211 to the high pressure superheater 103a at a temperature of about 460° C., as shown in FIG. 3A. It will be understood that the evaporator 201 and economizer 203 could be comprised of multiple parallel shell and tube heat exchangers, as shown in FIG. 4B.

In FIG. 4B, a pair of economizers/evaporators, as generally indicated at 213a, 213b, is shown. Each of which includes an evaporator 217a, 217b and an economizer 219a, 219b. Each economizer 217a, 217b receives high pressure boiler feedwater and/or condensate from condenser 13 via pump 17 (as shown in FIG. 1) via respective lines 221a, 221b so that the feedwater is heated in respective economizers 219a, 219b. The heated water is supplied to the inlet of respective evaporators 217a, 217b by respective lines 223a, 223b. Molten salt is discharged from evaporators 217a, 217b via respective lines 225a, 225b and is fed into the inlets of economizers 219a, 219b to initially heat the feedwater received from condenser 13. Still molten salt is returned from economizers 219a, 219b to cold tank 25 via line 227 at a temperature of about 290° C. Steam from evaporators 217a, 217b is supplied to the high pressure superheater coil 103a of FIG. 3A via a line 229.

Figure 5:
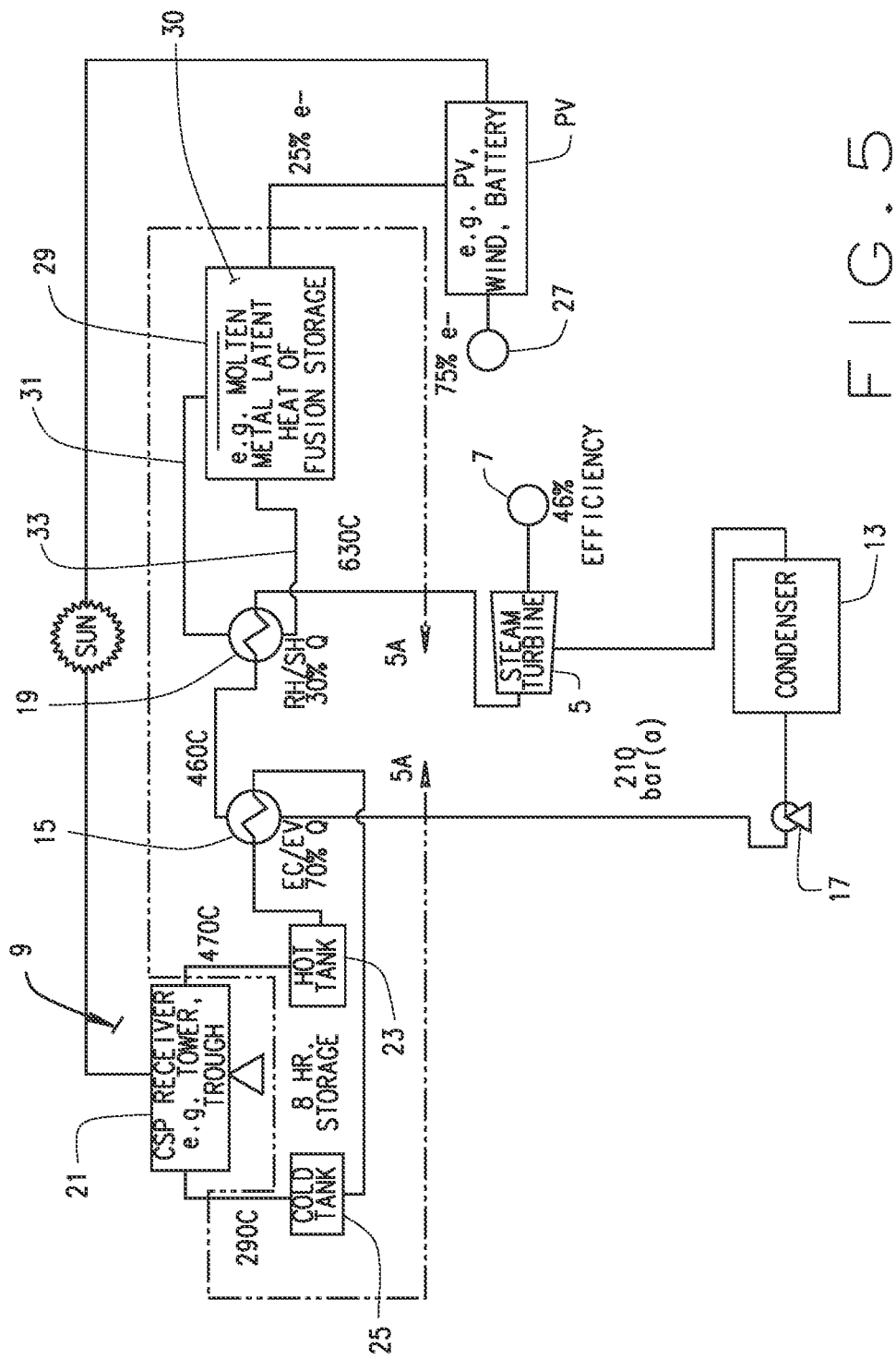
FIG. 5 is similar to FIG. 1 illustrating the power system, as shown in FIG. 1.
Figure 5A:
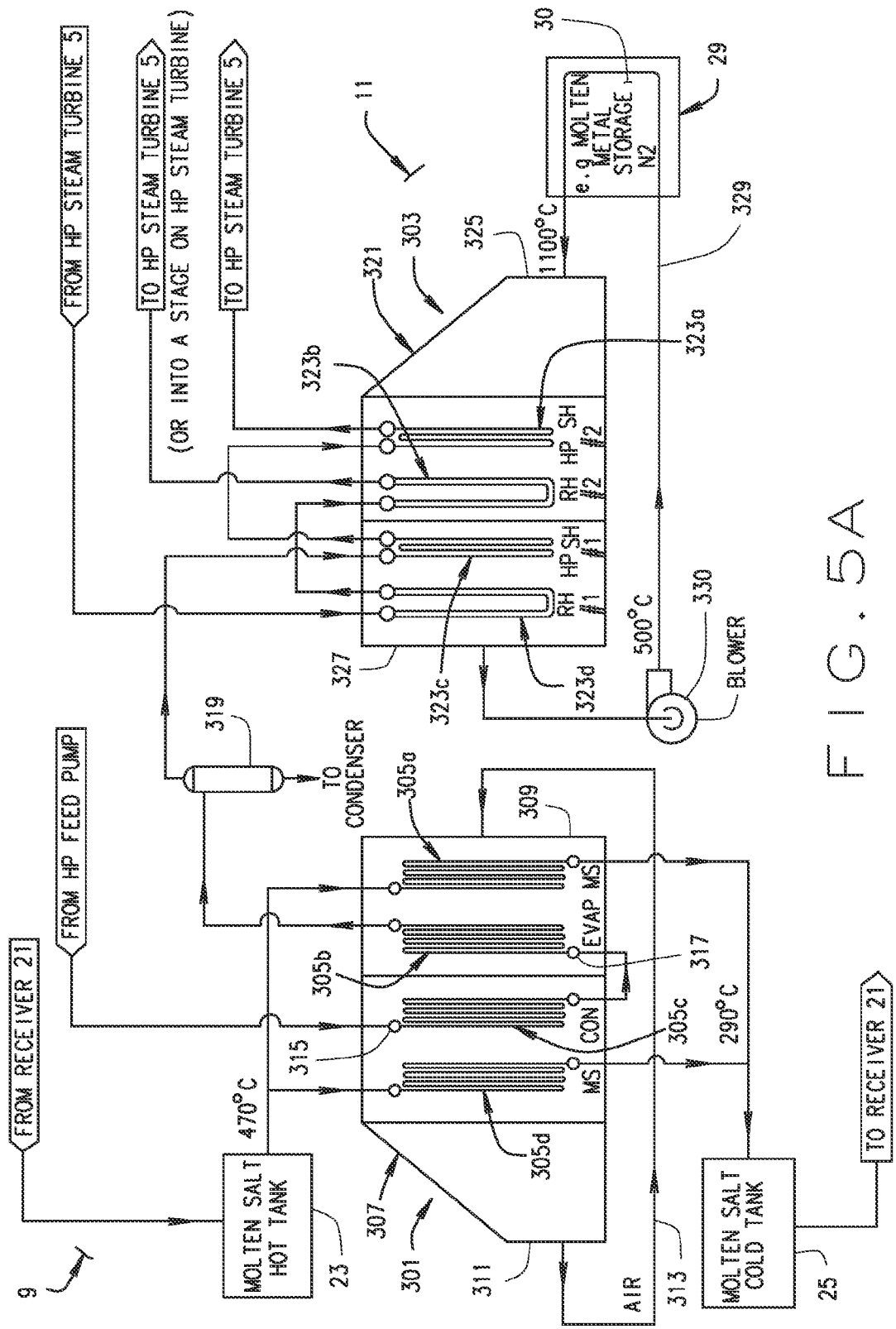
FIG. 5A is a view taken along line 5A-5A of FIG. 5 illustrating certain components of the first and second renewable energy systems of FIG. 1 and certain components from a first HRSG-like system and a second HRSG-like system incorporated therewith wherein a heated working fluid from the molten metal storage tank 29 is supplied to the inlet of the second HRSG-like system to heat coils therein, to receive steam from a high pressure extraction of the steam turbine 5, and to supply the intermediate and high pressure to the steam turbine 5.

Referring now to FIGS. 5 and 5A, the economizer/evaporator 15 and the reheater/superheater 19 of FIG. 1 are shown to be portions of two separate HRSG-like assemblies, as respectively generally indicated at 301 and 303. First, referring to HRSG-like assembly 301, hot molten salt from hot tank 23 is supplied to a first coil 305a and a last or fourth coil 305d located in a housing 307 having an inlet end 309 and an outlet end 311. Coils 305a and 305d serve as molten salt heaters to heat air (or another suitable working fluid) to a temperature somewhat less than about 470° C. that is recirculated from outlet 311 to inlet 309 by means of a recirculation duct or passage 313. Of course, a suitable high temperature fan or blower (not shown) is incorporated in the recirculation duct to move the heated air through housing 307 from the inlet to the outlet and through the recirculation duct. Condensate and/or feedwater from feedwater/condensate pump 17 is supplied to the inlet 315 of a third coil 305c, which serves as an economizer to heat the feedwater/condensate and to supply the heated feedwater/condensate to the inlet 317 of a second coil 305b. This last-mentioned coil serves as an evaporator to generate steam at a temperature somewhat less than about 460° C. that is supplied to a separator 319. It will be noted that all of the heat for HRSG assembly 301 is supplied by the first renewable energy system 9.

HRSG-like assembly 303 includes a housing 321 that houses a plurality of coils, as indicated at 323a, 323b, 323c and 323d. Housing 321 has an inlet end 325 and an outlet end 327. A working fluid, such as nitrogen, is heated by the high temperature heat storage medium 30 stored in tank 29 to a high temperature (e.g., about 1100° C.) and is supplied to the inlet end 325 of housing 321. This hot working fluid flows serially through the housing first through or past coil 323a, and then sequentially through or past the other coils 323b, 323c and 323d. The working fluid exits the housing via outlet 327 at a lower temperature (e.g., about 500° C.) and is recirculated back to the tank 29 by means of a recirculation duct or passageway 329 for being reheated by the high temperature heat storage medium 30 in tank 29. Of course, a high temperature blower or fan 330 is incorporated in the recirculation duct to recirculate the working fluid.

Steam from the high pressure stage of steam turbine 5 is supplied to the inlet end of a fourth coil 323d, which functions as a reheater. Upon exiting the reheating coil 323d, the reheated steam flows to the inlet of a second coil 323b, which serves as a second reheater. Steam exiting the second reheater coil 323b is supplied to the intermediate stage of turbine 5, or, alternatively, to a stage on a high pressure steam turbine. Steam from the separator 319 is supplied to the inlet of a third coil 323c, which serves as a first high pressure superheater. Superheated steam exits coil 323c and is supplied to the inlet of a first coil 323a, which serves as a second high pressure superheater. Superheated high pressure steam exits coil 323a at a temperature of about 630° C. and is supplied to the high pressure stage of turbine 5. Of course, as the high temperature working fluid flows from inlet 325 to outlet 327 and as it passes over or past coils 323a-323d, the temperature of the working fluid will decrease.

Figure 6:
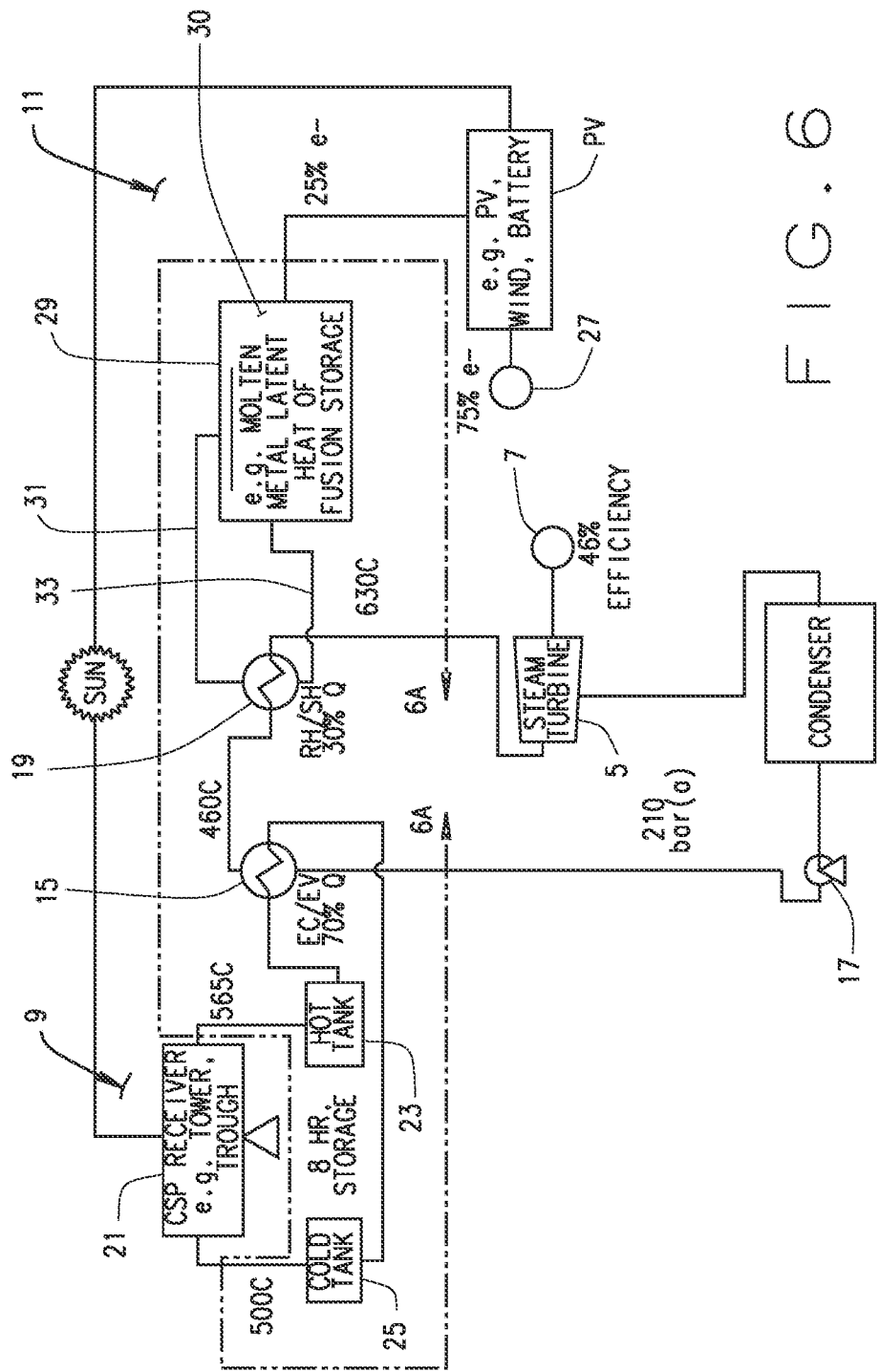
FIG. 6 is similar to FIG. 1 illustrating the power system, as shown in FIG. 1.
Figure 6A:
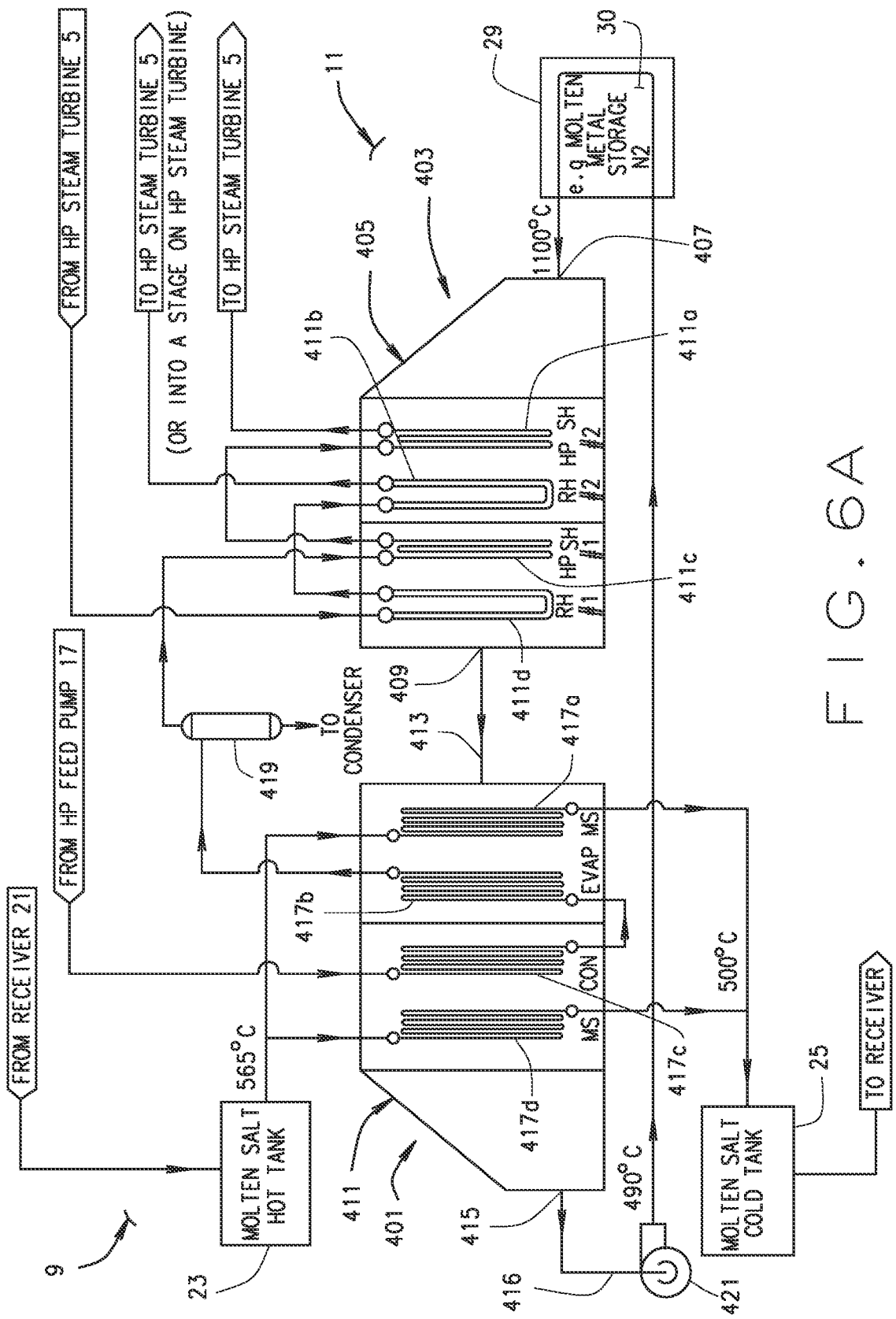
FIG. 6A is a view taken along line 6A-6A of FIG. 6, which is similar to (but different from) the arrangement of FIG. 5A, illustrating certain components of both the first and second renewable energy systems in combination with certain components from a HRSG-like systems for supplying high pressure and intermediate pressure steam to the steam turbine 5.

Referring now to FIGS. 6 and 6A, a somewhat different embodiment of the system of the present disclosure constituting the economizer/evaporator 15 and the reheater/superheater 19 of FIG. 1 is shown. Similar to the embodiment shown in FIG. 5A, FIG. 6A shows the economizer/evaporator 15 and the reheater/superheater 19 of FIG. 1 to be constituted by portions of two separate HRSG-like assemblies, as respectively generally indicated at 401 and 403, with assembly 401 constituting an equivalent of the economizer/evaporator 15 and with the assembly 403 constituting an equivalent of the reheater/superheater 19.

Assembly 403 is shown in FIG. 6A to have a housing 405 having an inlet 407 and an outlet 409, and a plurality of coils, as indicated at 411a, 411b, 411c and 411d, located within the housing 405. Inlet 407 receives a hot working fluid, such as nitrogen, that has been heated to a high temperature (e.g., about 1100° C.) by the high temperature heat storage medium 30 stored in tank 29. As the hot working fluid flows through housing 405 from its inlet 407 to its outlet 409, the coils within the housing are serially heated by the working fluid flowing through housing 405 for purposes as will be described. Thus, the coils located in assembly 403 are heated by the second renewable energy system 11.

The assembly 401 has a housing 411 having an inlet end 413 and an outlet end 415. A plurality of coils, as indicated at 417a, 417b, 417c and 417d, are mounted within housing 411. The working fluid discharged from housing 405 via outlet 409 has a temperature of about 500° C. as it enters inlet 413 of housing 411. As the working fluid flows through housing 411, the working fluid will serially heat coils 417a-417d. The working fluid discharged from outlet 415 enters a recirculation system 416. More particularly, the recirculation system has a high temperature fan 421 that recirculates the working fluid back to tank 29 where it is reheated by the high temperature medium 30.

As further shown in FIG. 6A, molten salt from hot tank 23 at a temperature of, for example, about 565° C. is introduced into the inlets of the first and fourth coils 417a and 417d such that these last-mentioned coils heat (or more accurately reheat) the working fluid flowing from HRSG-like assembly 403 flowing through housing 411. This reheating of the working fluid in assembly 403 is done by the first renewable energy system 9. Feedwater/condensate from condenser 13 is introduced by pump 17 into the inlet of the third coil 417c that serves as an economizer where it is heated by the working fluid flowing through housing 411. The heated feedwater exiting the third coil 417c is introduced into the inlet of a second coil 417b where it is evaporated by the working fluid flowing through housing 411 to form intermediate pressure steam. The steam evaporated in evaporator coil 417b flows to a separator 419, which separates steam from any liquid water, such that the liquid water is returned to condenser 13 and the steam is supplied to the inlet of coil 411c in assembly 403 where the steam is superheated such that coil 411c serves as a first high pressure superheater. The superheated steam from the outlet of coil 411c is supplied to the second high pressure superheater coil 411a and subsequently to the high pressure stage of steam turbine 5.

Still further as shown in FIG. 6A, steam from the high pressure stage of turbine 5 is supplied to the inlet of coil 411d where it is reheated by the working fluid flowing through housing 405. The reheated steam exits coil 411d and is supplied to the inlet of coil 411b where it is reheated such that coil 411b serves as a second reheater. The reheated steam from the outlet of coil 411b is supplied to the intermediate stage of turbine 5.

Figure 7:
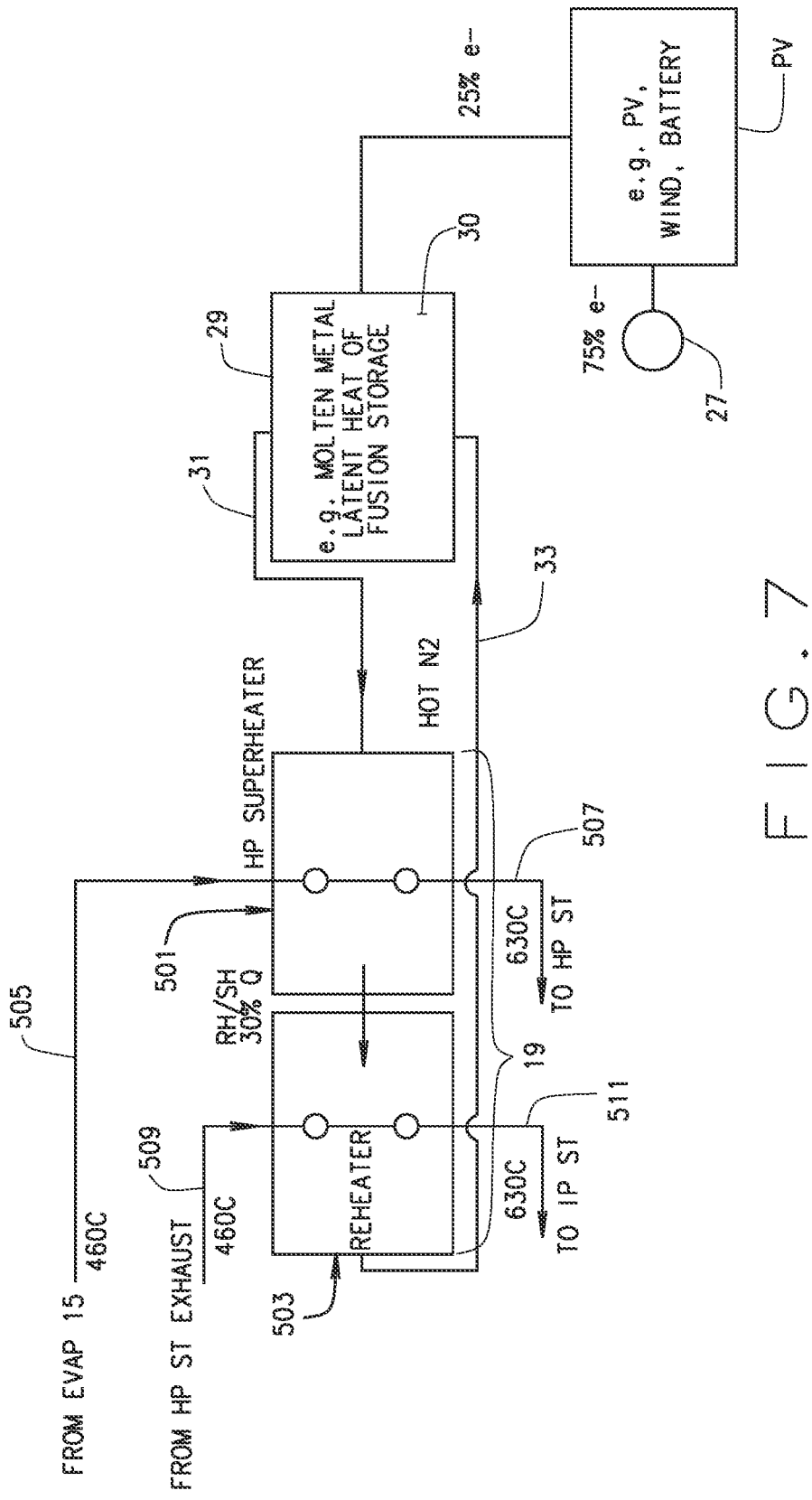
FIG. 7 is a view of a portion of the power system shown in FIG. 1 illustrating how the working fluid heated by the molten metal heat storage medium in high temperature tank 29 supplies heat to the superheater/reheater and how the superheater/reheater receives steam from the evaporator and from the high pressure steam turbine exhaust and how the superheater/reheater supplies high temperature superheated steam to the intermediate temperature and high pressure inlets to the steam turbine.

Turning now to FIG. 7, a somewhat more detailed illustration of the reheater/superheater 19, as described in regard to FIG. 1, is illustrated. In FIG. 7, reheater/superheater 19 is shown to comprise two sections, namely, a high pressure superheater 501 and a reheater 503. The superheater 501 receives intermediate pressure steam from evaporator 15 at a temperature of about 460° C. via a line 505. As shown in FIG. 1, the reheater/superheater 19 receives high temperature working fluid, preferably nitrogen, from the high temperature tank 29 via a line 31, where line 31 is also shown in FIG. 7. As previously described, the working fluid supplied from tank 29 is at a high temperature, for example about 1100° C. As shown in FIG. 7, the incoming intermediate pressure steam is superheated in superheater 501 by the high temperature working fluid and superheated steam at a temperature of, for example, about 630° C. is supplied to the high pressure stage of steam turbine 5 by way of line 507.

It will be appreciated that as the high temperature working fluid flows through or around superheater 501 and reheater 503, its temperature will decrease as it first flows around the superheater and then around the reheater. The reheater 503 receives the exhaust from the high pressure stage of turbine 5 via a line 509 at a temperature of, for example, about 460° C. This steam is reheated to about 630° C. and is supplied via a line 511 to the intermediate pressure stage of turbine 5. As the working fluid exhausts from reheater 509, it is recirculated back to hot tank 29 via line 33.

As various changes could be made in the above constructions methods without departing from the broad scope of the disclosure, it is intended that all matter contained in the above description or shown in the accompanying drawings shall be interpreted as illustrative and not in a limiting sense.

The invention claimed is:

1. A renewable power generation system comprising a steam powered electrical generation system having a steam turbine configured to drive an electrical generator, a first or low/moderate temperature renewable energy system configured to generate low/moderate temperature steam, and a second or high temperature renewable energy system configured to superheat the low/moderate temperature steam generated by the first renewable energy system and to supply superheated steam to said steam turbine;

wherein said first or low/moderate temperature renewable energy system is configured to utilize solar energy to heat a first working fluid to a low/moderate temperature and to store a sufficient quantity of said first working fluid heated to said low/moderate temperature sufficient to generate said low/moderate temperature steam both when the first renewable energy system is receiving solar energy and when during extended periods of time energy is not directly available from the sun; and wherein said second or high temperature renewable energy system is configured to utilize a second renewable energy source to heat a high temperature heat storage medium to a high temperature and to utilize said high temperature heat storage medium to heat a high temperature heat transfer working medium to a sufficiently high temperature so as to superheat said low/moderate temperature steam generated by said first renewable system so that superheated steam can be supplied to said steam turbine.

2. A renewable power generation system comprising a steam powered electrical generation system having a steam turbine configured to drive an electrical generator, a first or low/moderate temperature renewable energy system configured to generate low/moderate temperature steam, and a second or high temperature renewable energy system configured to superheat the low/moderate temperature steam generated by the first renewable energy system and to supply superheated steam to said steam turbine;

wherein said first or low/moderate temperature renewable energy system is configured to utilize solar energy to heat a first working fluid to a low/moderate temperature and to store a sufficient quantity of said first working fluid heated to said low/moderate temperature sufficient to generate said low/moderate temperature steam both when the first renewable energy system is receiving solar energy and when during extended periods of time energy is not directly available from the sun; and wherein said second or high temperature renewable energy system is configured to utilize a second renewable energy source to be capable of heating a high temperature heat storage medium to a high temperature and to utilize said high temperature heat storage medium to heat a gaseous high temperature heat transfer working medium to a sufficiently high temperature so that the said heated gas can superheat said low/moderate temperature steam generated by said first renewable system so that superheated steam is supplied to said steam turbine;

wherein said second renewable energy system is configured to generate electricity, where at least a portion of the electricity generated by said second renewable energy system is configured to electrically heat a high temperature heat storage medium to a sufficiently high temperature to heat said heat transfer gas when the latter is brought into heat transfer relation with said heat storage medium such that the heat transfer gas is capable of superheating said low/moderate temperature steam, a tank for holding a supply of said heat storage medium heated to said high temperature, and a superheater adapted to be heated by said heat transfer gas to superheat the low/moderate temperature steam generated by said first renewable energy system and to supply superheated steam to said steam turbine.

3. The renewable power generation system as set forth in claim 2 wherein said supply of said first working fluid is stored in a hot tank, and wherein said system is configured to deliver said first working fluid from said hot tank to an evaporator for generating said low/moderate temperature steam.

4. The renewable power generation system as set forth in claim 3 wherein said system is configured to store said first working fluid after exiting said evaporator in a cold tank to be reheated to said low/moderate temperature by said first renewable energy system when solar energy is available.

5. The renewable power generation system as set forth in claim 4 wherein said heat storage medium is heated by an electrical heater to a desired temperature, and wherein said electrical heater is configured to be powered by said second renewable energy system.

6. The renewable power generation system as set forth in claim 5 wherein said second renewable energy system includes a heat storage medium storage tank for holding a sufficient quantity of said heated heat storage medium so as to enable in superheating of said low/moderate temperature steam for an extended period when said second renewable energy system is not available.

7. The renewable power generation system as set forth in claim 6 wherein said system is configured to circulate said heat transfer gas at a low pressure so as to be in heat transfer relation with said molten heat storage medium, said system being configured to supply said heated heat transfer gas to said superheater at a temperature and at a flowrate sufficient to superheat said low/moderate temperature steam so as to supply superheated steam to said steam turbine.

8. The renewable power generation system as set forth in claim 7 wherein, after said heat transfer gas superheats said low/moderate temperature steam, said system is configured to return said heat transfer gas to be reheated by said high temperature heat storage medium.

9. The renewable power generation system as set forth in claim 2 wherein said heat storage material is a molten metal or metalloid.

10. The renewable power generation system as set forth in claim 2 wherein said heat storage material is a suitable high temperature solid material, selected from a group consisting of sand, rock, concrete, or ceramic material.

11. The renewable power generation system as set forth in claim 1 wherein said system is configured such that after said superheated steam powers said steam turbine, low temperature steam and/or condensate from said steam turbine flows to a condenser, and wherein condensate from said condenser is supplied to an evaporator to generate said low/moderate temperature steam.

12. The renewable power generation system as set forth in claim 1 wherein said first or low/moderate temperature renewable energy system is a concentrated solar power system and wherein said first working fluid is a molten salt working fluid.

13. The renewable power generation system as set forth in claim 1 wherein said first or low/moderate temperature renewable energy system is a trough reflector system, and wherein said first working fluid is a molten salt working fluid.

14. The renewable power generation system as set forth in claim 6 wherein said second renewable energy system is configured to have a high temperature portion that includes said high temperature heat storage medium storage tank which is configured to contain a molten heat storage medium so as to prevent undue oxidation or other degradation of the molten heat storage medium, a superheater configured to superheat said low/moderate temperature steam supplied thereto, and piping configured to supply said heat transfer gas after the latter has been heated by said molten heat storage medium to said superheater so as to superheat said low/moderate temperature steam, and wherein said high temperature heat storage tank and said piping constitute a high temperature portion of said second renewable energy system, and wherein only said high temperature portion need be constructed of special high temperature materials.

15. The renewable power generation system as set forth in claim 14 wherein said molten heat storage medium is of a sufficient quantity and is at a sufficient temperature such that said molten heat storage medium is capable of heating said heat transfer gas to a temperature sufficient to superheat said low/moderate temperature steam for extended periods.

16. The renewable power generation system as set forth in claim 14 wherein said molten heat storage medium is a metalloid.

17. The renewable power generation system as set forth in claim 16 wherein said molten heat storage medium is silicon.

18. The renewable power generation system as set forth in claim 3 wherein said first renewable energy system includes an economizer/evaporator, and wherein said first renewable energy system is configured to supply said low/moderate temperature working fluid from the hot storage tank to said economizer/evaporator to generate low/moderate temperature steam.

19. The renewable power generation system as set forth in claim 14 wherein said molten heat transfer medium is selected from the group consisting essentially of one or more of the following: boron, silicon, germanium, arsenic, antimony, tellurium, polonium, lead bismuth eutectic, sodium, tin, or lead.

20. The renewable power generation system as set forth in claim 14 wherein said molten heat transfer medium comprises one of the following: boron, silicon, germanium, arsenic, antimony, tellurium, polonium, lead bismuth eutectic, sodium, tin, or lead.

21. The renewable power generation system as set forth in claim 3 wherein said superheater comprises a high pressure superheater and a reheater, said high pressure superheater being configured to be heated by said heat transfer gas heated to a high temperature by said heat storage material (30) in high temperature heat storage tank (29), and being configured to be supplied with low/intermediate temperature steam from said evaporator thereby to produce superheated steam that is delivered to a high pressure stage of said steam turbine, and said reheater being configured to receive high pressure steam turbine exhaust from said steam turbine and is further configured to be heated by said heat transfer gas in the reheat superheater thereby to produce intermediate pressure steam that is delivered to an intermediate pressure stage of said steam turbine.

22. The renewable power generation system as set forth in claim 21 being further configured such that after said heat transfer gas has passed through said superheater and said reheater it is returned to be reheated by said high temperature heat storage material.

23. The renewable power generation system as set forth in claim 2 wherein said supply of said first working fluid is stored in a hot tank (23), and wherein said system is configured to deliver said first working fluid from said hot tank (23) to an evaporator (15, 201) for generating said low/moderate temperature steam.

24. The renewable power generation system as set forth in claim 23 wherein said evaporator (15, 201) includes an economizer (203) configured to receive condensate from said turbine, said evaporator (15, 201) being configured to deliver said first working fluid from said evaporator to said economizer (203), said economizer being configured to heat said condensate therein and to deliver said heated condensate to said evaporator, the latter being configured to use said first working fluid to generate said low/moderate temperature steam which is delivered to said superheater.

25. The renewable energy system as set forth in claim 23 wherein said first working fluid, after being discharged from said economizer, is delivered to a cold storage tank.

26. The renewable energy system as set forth in claim 25 configured such that said evaporator and said economizer constitute a first pair of an evaporator and an economizer, and wherein said renewable energy system further comprises a second pair of an evaporator and an economizer where said pairs are connected in parallel to one another with the evaporator of each pair being configured to receive said first working fluid from said hot tank (23) and with the economizer of each pair being configured to receive condensate from said turbine, wherein each of said evaporators of each said pair being configured to supply said first working fluid to each said respective economizer after said first working fluid has passed through said evaporator, each of said economizers being configured to heat said condensate by said first working fluid flowing through each said economizer and to deliver the heated condensate to its respective said evaporator, each of said economizers being configured to deliver said working fluid exiting said economizers to a cold storage tank.

27. A renewable power generation system comprising a steam powered electrical generation system having a steam turbine configured to drive an electrical generator, a first or low/moderate temperature renewable energy system configured to generate low/moderate temperature steam, and a second or high temperature renewable energy system configured to superheat the low/moderate temperature steam generated by the first renewable energy system and to supply superheated steam to said steam turbine, said first or low/moderate temperature renewable energy system being configured to utilize solar energy to heat a first working fluid to a low/moderate temperature and to store a sufficient quantity of said first working fluid heated to said low/moderate temperature sufficient to generate said low/moderate temperature steam both when the first renewable energy system is receiving solar energy and when during extended periods of time energy is not available from the sun, said low/moderate temperature renewable energy system being configured to supply heat to an evaporator to generate said low/moderate temperature steam, a second or high temperature renewable energy system configured to utilize a renewable energy source to heat a high temperature heat transfer working fluid to a sufficiently high temperature so as to superheat said low/moderate temperature steam generated by said first renewable system so that superheated steam is supplied to said steam turbine, said second or high temperature renewable energy system having a superheater configured to be heated by said high temperature working fluid for generating superheated steam, said second renewable energy system being configured to generate electricity, where at least a portion of the electricity generated by said second renewable energy system is configured to electrically heat a high temperature heat storage medium to a sufficiently high temperature to heat said high temperature working fluid to a desired high temperature when the latter is brought into heat transfer relation with said heat storage medium such that the high temperature working fluid when brought into operational relation with said superheater superheats said low/moderate temperature steam and supplies superheated steam to said steam turbine, a tank for holding a supply of said heat storage medium heated to said high temperature, said power generation system further comprising a HRSG-like assembly comprising a housing having an inlet and an outlet where the inlet is configured to receive said high temperature working fluid heated by said high temperature heat storage medium with said high temperature working fluid flowing through and exiting from said housing, a recirculation system configured to receive said high temperature working fluid from said exit and to return said high temperature working fluid to be reheated by said high temperature heat storage medium, said housing having a plurality of coils therein arranged within said housing to be sequentially heated by said high temperature working fluid flowing through said housing from said inlet to said outlet, said plurality of coils including a first coil positioned within said housing so as to be the first of said coils heated by the high temperature working fluid as the latter enters the housing, a second coil arranged in said housing downstream of said first coil, a third coil arranged in said housing downstream of said second coil, and a fourth coil arranged in said housing downstream from said third coil, said coils being configured so that the temperature of said working fluid can decrease as it passes around each of said coils, said fourth coil being configured to receive steam from said turbine at a relatively low temperature, to reheat said steam, and to supply said reheated steam to the inlet of said second coil, said second coil being configured to reheat said reheated steam and to supply the reheated steam to an appropriate stage of said steam turbine, said third coil having an inlet configured to receive steam from said evaporator that is heated by said first renewable energy system, said third coil being configured to be a superheater to superheat said steam therein to a temperature somewhat higher than the temperature of the steam exiting said evaporator and to supply said superheated steam to the inlet of said first coil which constitutes a second superheater configured to further superheat said steam, said first coil supplying said superheated steam to said turbine.

28. A renewable power generation system comprising a steam powered electrical generation system having a steam turbine (5) configured to drive an electrical generator (7), a first or low/moderate temperature renewable energy system (9) configured to generate low/moderate temperature steam, and a second or high temperature renewable energy (11) system configured to superheat the low/moderate temperature steam generated by the first renewable energy system and to supply superheated steam to said steam turbine (5), said first or low/moderate temperature renewable energy system (9) being configured to utilize solar energy to heat a first working fluid to a low/moderate temperature and to store a sufficient quantity of said first working fluid heated to said low/moderate temperature sufficient to generate said low/moderate temperature steam both when the first renewable energy system (9) is receiving solar energy and when during extended periods of time energy is not available from the sun, said low/moderate temperature renewable energy system (9) being configured to supply heat to an evaporator (15) to generate said low/moderate temperature steam, said second or high temperature renewable energy system (11) being configured to utilize a renewable energy source to heat a high temperature heat transfer working fluid to a sufficiently high temperature so as to superheat said low/moderate temperature steam generated by said first renewable system so that superheated steam is supplied to said steam turbine, said second or high temperature renewable energy system (11) having a superheater (19) configured to be heated by said high temperature working fluid for generating superheated steam, said second renewable energy system (11) being configured to generate electricity, where at least a portion of the electricity generated by said second renewable energy system is configured to electrically heat a sufficient quantity of a high temperature heat storage medium (30) to a sufficiently high temperature to heat said high temperature working fluid to a desired high temperature when the latter is brought into heat transfer relation with said heat storage medium such that the high temperature working fluid when brought into operational relation with said superheater (19) can superheat said low/moderate temperature steam and supplies superheated steam to said steam turbine, a tank (29) for holding a sufficient quantity of said heat storage medium (30) heated to said high temperature to generate said superheated steam supplied to said turbine both when the second renewable energy system (11) is available when it is not available for an extended period of time, said power generation system (1) having a first and a second HRSG-like assembly (301, 303) each comprising a housing (307, 321) having an inlet (309, 325) and an outlet (311, 327) where the inlet (325) for said first HRSG-like assembly (303) is configured to receive said high temperature working fluid heated by said high temperature heat storage medium (30) with said high temperature working fluid flowing through and exiting from said second housing (321) via said outlet (327), a recirculation system (329) configured to receive said high temperature working fluid from the exit (327) of said second housing (321) and to return said high temperature working fluid to be reheated by said high temperature heat storage medium (30), said second housing (321) having a plurality of coils (323*d*, 323*c*, 323*b*, 323*a*) arranged within said housing (321) adapted to be sequentially heated by said high temperature working fluid flowing through said housing (321) from said inlet (325) to said outlet (327), said plurality of coils including a first coil positioned (323*a*) within said housing (321) so as to be the first of said coils heated by the high temperature working fluid as the latter enters the housing (321), a second coil (323*b*) arranged in said housing downstream of said first coil (323*a*), a third coil (323*c*) arranged in said housing downstream of said second coil (323*b*), and a fourth coil (323*d*) arranged in said housing (321) downstream from said third coil (323*c*), the temperature of said working fluid decreasing as it passes around each of said coils, said fourth coil (323*d*) being configured to receive steam from said turbine at a relatively low temperature, to reheat said steam, and to supply said reheated steam to the inlet of second coil (323*b*), said second coil (323*b*) being configured to reheat said reheated steam and to supply the reheated steam to an appropriate stage of said steam turbine (5), said third coil (323*c*) having an inlet configured to receive steam heated by said first renewable energy system (9), said third coil (323*c*) being configured to superheat said steam therein to a temperature somewhat higher than the temperature of the steam exiting said evaporator (15) and to supply said superheated steam to the inlet of said first coil (323*a*) which constitutes a second superheater configured to further superheat said steam, said first coil supplying said superheated steam to said turbine, said housing (307) of said first HRSG-like assembly (301) having a plurality of coils (305*a*, 305*b*, 305*c*, 305*d*) located therein, a recirculation system (313) configured to circulate a flow of a heat transfer gas (e.g., air) through said housing (307) from said inlet (309) past said coils and out outlet (311), said first and last coils (305*a*, 305*d*) in said housing (307) receiving molten salt from hot tank (23) for heating said heat transfer gas flowing through said housing (307), said third coil (305*c*) being configured to receive feedwater from said feed pump (17), to heat said feed water to an elevated temperature, and to supply said heated feedwater to an inlet of said second coil (305*b*), said third coil being configured to form steam at a low/moderate temperature and to supply said low/moderate temperature steam to the inlet of the second coil (323*b*) in said second HRSG-like assembly for the purpose described above.

29. A renewable power generation system comprising a steam powered electrical generation system having a steam turbine (5) configured to drive an electrical generator (7), a first or low/moderate temperature renewable energy system (9) configured to generate low/moderate temperature steam, and a second or high temperature renewable energy (11) system configured to superheat the low/moderate temperature steam generated by the first renewable energy system and to supply superheated steam to said steam turbine (5), said first or low/moderate temperature renewable energy system (9) being configured to utilize solar energy to heat a first working fluid to a low/moderate temperature and to store a sufficient quantity of said first working fluid heated to said low/moderate temperature sufficient to generate said low/moderate temperature steam both when the first renewable energy system (9) is receiving solar energy and when during extended periods of time energy is not available from the sun, said low/moderate temperature renewable energy system (9) being configured to supply heat to an evaporator (15) to generate said low/moderate temperature steam, said second or high temperature renewable energy system (11) being configured to utilize a renewable energy source to heat a high temperature heat transfer working fluid to a sufficiently high temperature so as to superheat said low/moderate temperature steam generated by said first renewable system so that superheated steam is supplied to said steam turbine, said second or high temperature renewable energy system (11) having a superheater (19) configured to be heated by said high temperature working fluid for generating superheated steam, said second renewable energy system (11) being configured to generate electricity, where at least a portion of the electricity generated by said second renewable energy system is configured to electrically heat a sufficient quantity of a high temperature heat storage medium (30) to a sufficiently high temperature to heat said high temperature working fluid to a desired high temperature when the latter is brought into heat transfer relation with said heat storage medium such that the high temperature working fluid when brought into operational relation with said superheater (19) superheats said low/moderate temperature steam and supplies superheated steam to said steam turbine, a tank (29) for holding a sufficient quantity of said heat storage medium (30) heated to said high temperature to generate said superheated steam supplied to said turbine both when the second renewable energy system (11) is available and when it is not available for an extended period of time, said power generation system (1) having a first and a second HRSG-like assembly (401, 403) each comprising a respective housing (411, 405) each having a respective inlet (413, 407) and an outlet (415, 409) where the inlet (407) for said second HRSG-like assembly (403) is configured to receive said high temperature working fluid heated by said high temperature heat storage medium (30) with said high temperature working fluid flowing through and exiting from said second housing (405) via said outlet (409), a recirculation system (416) configured to receive said high temperature working fluid from the exit (415) of said housing (411) of said first HRSG-like assembly (401) and to return said high temperature working fluid to be reheated by said high temperature heat storage medium (30), said housing (411) of said first HRSG-like assembly (401) having a plurality of coils (417*a*, 417*b*, 417*c*, 417*d*) arranged to be sequentially heated by said high temperature working fluid flowing through said first HRSG-like assembly 401, said plurality of coils (417*a*, 417*b*, 417*c*,417*d*) including a first coil (417*a*) positioned within said housing (411) so as to be the first of said coils in said second housing (411) heated by the high temperature working fluid as the latter enters the housing (411) via inlet (413), a second coil (417*b*) arranged in said housing (411) downstream of said first coil (417*a*), a third coil (417*c*) arranged in said housing (411) downstream of said second coil (417*b*), and a fourth coil (417*d*) arranged in said housing (411) downstream from said third coil (417*c*), the temperature of said working fluid decreasing as it passes around each of said coils, said third coil (417*c*) being configured to receive condensate from said condenser (13) at a relatively low temperature to reheat said condensate and to supply said reheated condensate to the inlet of second coil (417*b*), said second coil (417*b*) being configured to evaporate said reheated condensate and to supply the steam to said second HRSG-like assembly (403), said first and fourth coils (417*a*, 417*d*) being configured to receive said first working fluid from said hot tank 23 which is heated by said first renewable energy system (9) so as to heat the high temperature working fluid flowing through the first HRSG-like assembly (401), said housing (405) of said second HRSG-like assembly (403) having a plurality of coils (411*a*, 411*b*, 411c, 411d) located therein, said recirculation system (416) configured to circulate a flow of said high temperature heat transfer gas through said housing (407) being from said inlet (407) past said coils (411a, 411b, 411c, 411d) and out outlet (409) and into inlet (413) of the first HRSG-like assembly (401), said first and last coils (411a and 411d) in said housing (411) being adapted to receive molten salt from hot tank (23) for heating said heat transfer gas flowing through said housing (411) and to return said molten salt to cold tank (25) after the molten salt is discharged from the first and last coils (411a, 411d), said third coil (417c) being configured to receive feedwater from said feed pump (17), to heat said feed water to an elevated temperature, and to supply said heated feedwater to an inlet of said third coil (417c), said third coil (417c) being configured evaporate said heated feedwater to form low/moderate temperature steam and to supply said low/moderate temperature steam to the inlet of the third coil (411c) in said second HRSG-like assembly (403) for superheating said low/moderate temperature steam and for supplying high pressure superheated steam to said steam turbine (5).

30. A method of renewable energy power generation utilizing a steam powered electrical generation system having a steam turbine that drives an electrical generator, a first or low/moderate temperature renewable energy system that generates low/moderate temperature steam, and a second high temperature renewable energy system that superheats the low/moderate temperature steam and supplies superheated steam to the steam turbine, said high temperature renewable energy system being a renewable energy system that generates electricity, said method comprises the following steps:
   a. Utilizing solar energy in said low/moderate temperature renewable energy system to heat a first working fluid to a desired low/moderate temperature;
   b. Storing a quantity of said first working fluid heated to said low/moderate temperature sufficient to generate said low/moderate temperature steam both while solar energy is available and for extended periods when solar energization is not available;
   c. Utilizing renewable energy to generate electricity in a second renewable energy system;
   d. Utilizing at least a portion of the electricity generated by said second renewable energy system to heat a heat transfer gas to a high temperature; and
   e. Supplying said high temperature heat transfer gas to a superheater in sufficient quantity to superheat said low/moderate temperature steam and to supply superheated steam to said steam turbine.

31. The method of claim 30 wherein said first working fluid is molten salt heated by said first renewable energy system to said desired low/moderate temperature, and wherein said method further comprises storing a quantity of said molten salt heated to said desired low/moderate temperature, and supplying said molten salt at said desired low/moderate temperature to an evaporator configured to generate said low/moderate temperature steam, said quantity of molten salt stored being sufficient both while solar energy is available and when solar energy is not available for brief and/or extended periods to generate said low/moderate temperature steam.

32. The method of claim 30 further comprising supplying said low/moderate temperature steam to a superheater.

33. The method of claim 32 wherein said step of heating said transfer gas to a high temperature comprises heating a heat storage medium to a high temperature and utilizing said heat storage medium to heat said heat transfer gas to a sufficiently high temperature such that it is capable of superheating said low/moderate temperature steam in said superheater.

34. The method of claim 32 wherein the quantity of said heat storage medium heated to such high temperature is sufficient to heat said heat transfer gas for brief and/or for extended periods when energy from said second renewable energy system is not available such that said heat storage medium is capable of continuing to heat said heat transfer gas and to continue to superheat said low/moderate temperature steam for such brief or extended periods.

35. The method of claim 30 further comprising configuring said high temperature renewable energy system to have a high temperature portion including a storage tank for containing said high temperature heat storage medium and piping for delivery of said heat transfer gas after it has been heated by said heat storage medium to said superheater.

36. The method of claim 35 comprising further configuring said high temperature portion to include return piping for the return of said heat transfer gas from said superheater to be reheated by said heat storage medium.

37. The method of claim 35 further comprising fabricating said high temperature portion of high temperature materials.

38. The method of claim 35 wherein said high temperature heat storage medium is a metal or metalloid, and wherein said method further comprises utilizing electrical energy generated by said second renewable energy system to heat said metal or metalloid to a molten state.

39. The method of claim 38 further comprising pressurizing said heat transfer gas to a low pressure level.

40. The method of claim 38 further comprising storing said molten metal or metalloid within said storage tank in a manner so as to prevent dissociation of any reactive gases acting thereon and/or to prevent undue oxidation of said molten metal or metalloid.

41. The method of claim 40 wherein said step of storing said molten metal or metalloid involves blanketing said molten heat storage medium in said tank with a gas capable of preventing oxidation of said molten heat storage medium.

42. The method of claim 41 wherein said heat transfer gas is an inert gas.

43. The method of claim 41 wherein said heat transfer gas is nitrogen.

44. The method of claim 41 wherein said heat transfer gas is air.

45. The method of claim 30 wherein said first working fluid is a power cycle working fluid is carbon dioxide ($CO_2$) in its subcritical, supercritical, or mixed phases, and wherein said first working fluid is with or without recuperation, double recuperation, intercooling, or supercharging.

46. The method of claim 30 wherein said first working fluid is a power cycle in an organic Rankine cycle (ORC), and wherein said first working fluid is with or without recuperation, double recuperation, intercooling, or supercharging.

47. The method of claim 30 wherein said steam turbine has a steam power cycle that contains generated intermediate and/or low pressure steam.

48. The method of claim 30 wherein some heat is exported in addition to power from either the low/intermediate cycle, or the high temperature cycle, or both.

49. The method of claim 30 wherein at least some heat is exported in addition to and/or in lieu of power from either the low/intermediate cycle, or the high temperature cycle, or both.

50. The method of claim 30 wherein there are more than two renewable heat sources.

51. The method of claim 30 wherein one or more of said renewable energy system include a battery backup system.

52. The method of claim 30 wherein the first renewable energy source is a solar, wind, hydroelectric, geothermal, or other renewable energy system, and wherein the working fluid is heated electrically.

53. The method of claim 30 wherein the second high temperature storage medium is a solid material selected from a group consisting of ceramic, stone, or concrete.

* * * * *